US008230108B2

(12) United States Patent
Pratt, Jr. et al.

(10) Patent No.: US 8,230,108 B2
(45) Date of Patent: Jul. 24, 2012

(54) ROUTING PACKETS ON A NETWORK USING DIRECTED GRAPHS

(75) Inventors: Wallace A. Pratt, Jr., Pflugerville, TX (US); Mark J. Nixon, Round Rock, TX (US); Eric D. Rotvold, West St. Paul, MN (US); Robin S. Pramanik, Karlsruhe (DE); Tomas P. Lennvall, Vasteras (SE); Yuri Zats, Menlo Park, CA (US); Terrence L. Blevins, Round Rock, TX (US)

(73) Assignees: Hart Communication Foundation, Austin, TX (US); Dust Networks, Inc.

( * ) Notice: Subject to any disclaimer, the term of this patent is extended or adjusted under 35 U.S.C. 154(b) by 338 days.

(21) Appl. No.: 12/101,071

(22) Filed: Apr. 10, 2008

(65) Prior Publication Data

US 2009/0046732 A1 Feb. 19, 2009

Related U.S. Application Data

(60) Provisional application No. 60/911,795, filed on Apr. 13, 2007.

(51) Int. Cl.
*G06F 15/16* (2006.01)
*G06F 12/00* (2006.01)

(52) U.S. Cl. ...................................................... 709/238
(58) Field of Classification Search ........... 709/238–250
See application file for complete search history.

(56) References Cited

U.S. PATENT DOCUMENTS

| 4,792,944 A | 12/1988 | Takahashi et al. |
| 5,159,592 A | 10/1992 | Perkins |
| 5,719,859 A | 2/1998 | Kobayashi et al. |
| 6,198,751 B1 | 3/2001 | Dorsey et al. |
| 6,236,334 B1 * | 5/2001 | Tapperson et al. ....... 340/825.37 |

(Continued)

FOREIGN PATENT DOCUMENTS

CN 1170464 A 1/1998

(Continued)

OTHER PUBLICATIONS

International Preliminary Report on Patentability from corresponding International Application No. PCT/US08/04740 (Oct. 13, 2009).

(Continued)

*Primary Examiner* — Zarni Maung
(74) *Attorney, Agent, or Firm* — Marshall, Gerstein & Borun LLP

(57) ABSTRACT

A method of routing a data packet between a first node and a second node on a communication network includes defining a first graph through the first node and the second node and zero or more intermediate nodes, associating several nodes which belong to the communication network with the first graph, associating a first unique graph identifier with the first graph and providing at least partial definitions of the first graph and the first unique identifier to at least some of the nodes associated with the first graph. The method then sends data packet with the graph identifier from the first node, and directs the data packet to the second node via the zero or more intermediate nodes using the graph identifier. This method may include forwarding the packet to a neighbor node of an intermediate node if the intermediate node and the neighbor node are nodes associated with the first graph and if the intermediate node and the neighbor node are connected by at least one direct communication connection.

25 Claims, 11 Drawing Sheets

U.S. PATENT DOCUMENTS

| | | |
|---|---|---|
| 6,298,377 B1 | 10/2001 | Hartikainen et al. |
| 6,578,047 B1 | 6/2003 | Deguchi |
| 6,594,530 B1 | 7/2003 | Glanzer et al. |
| 6,801,777 B2 | 10/2004 | Rusch |
| 6,891,838 B1 | 5/2005 | Petite et al. |
| 6,920,171 B2 | 7/2005 | Souissi et al. |
| 6,959,356 B2 | 10/2005 | Packwood et al. |
| 6,970,909 B2 | 11/2005 | Schulzrinne |
| 6,996,100 B1 | 2/2006 | Haartsen |
| 7,002,958 B1 | 2/2006 | Basturk et al. |
| 7,110,380 B2 | 9/2006 | Shvodian |
| 7,292,246 B2 * | 11/2007 | Goldschmidt ............... 345/440 |
| 7,375,594 B1 | 5/2008 | Lemkin et al. |
| 7,420,980 B1 | 9/2008 | Pister et al. |
| 7,529,217 B2 * | 5/2009 | Pister et al. ................. 370/338 |
| 7,602,741 B2 | 10/2009 | Tapperson et al. |
| 7,675,935 B2 | 3/2010 | Samudrala et al. |
| 7,680,033 B1 | 3/2010 | Khan et al. |
| 7,848,827 B2 | 12/2010 | Chen |
| 7,853,221 B2 | 12/2010 | Rodriguez et al. |
| 2001/0030957 A1* | 10/2001 | McCann et al. ............. 370/351 |
| 2001/0041591 A1 | 11/2001 | Carroll |
| 2002/0007414 A1 | 1/2002 | Inoue et al. |
| 2002/0067693 A1 | 6/2002 | Kodialam et al. |
| 2002/0111169 A1 | 8/2002 | Vanghi |
| 2002/0120671 A1 | 8/2002 | Daffner et al. |
| 2003/0014535 A1 | 1/2003 | Mora |
| 2003/0026268 A1 | 2/2003 | Navas |
| 2003/0040897 A1 | 2/2003 | Murphy et al. |
| 2003/0074489 A1 | 4/2003 | Steger et al. |
| 2003/0169722 A1 | 9/2003 | Petrus et al. |
| 2003/0198220 A1 | 10/2003 | Gross et al. |
| 2003/0236579 A1 | 12/2003 | Hauhia et al. |
| 2004/0028023 A1 | 2/2004 | Mandhyan et al. |
| 2004/0053600 A1 | 3/2004 | Chow et al. |
| 2004/0095951 A1 | 5/2004 | Park |
| 2004/0117497 A1 | 6/2004 | Park |
| 2004/0148135 A1 | 7/2004 | Balakrishnan et al. |
| 2004/0174904 A1 | 9/2004 | Kim et al. |
| 2004/0203973 A1 | 10/2004 | Khan |
| 2004/0257995 A1 | 12/2004 | Sandy et al. |
| 2004/0259533 A1 | 12/2004 | Nixon et al. |
| 2005/0013253 A1 | 1/2005 | Lindskog et al. |
| 2005/0018643 A1 | 1/2005 | Neilson et al. |
| 2005/0025129 A1 | 2/2005 | Meier |
| 2005/0030968 A1 | 2/2005 | Rich et al. |
| 2005/0049727 A1 | 3/2005 | Tapperson et al. |
| 2005/0078672 A1 | 4/2005 | Caliskan et al. |
| 2005/0085928 A1 | 4/2005 | Shani |
| 2005/0114517 A1 | 5/2005 | Maffeis |
| 2005/0125085 A1 | 6/2005 | Prasad et al. |
| 2005/0160138 A1 | 7/2005 | Ishidoshiro |
| 2005/0164684 A1 | 7/2005 | Chen et al. |
| 2005/0190712 A1 | 9/2005 | Lee et al. |
| 2005/0192037 A1 | 9/2005 | Nanda et al. |
| 2005/0213612 A1* | 9/2005 | Pister et al. ................. 370/503 |
| 2005/0228509 A1 | 10/2005 | James |
| 2005/0239413 A1 | 10/2005 | Wiberg et al. |
| 2005/0249137 A1 | 11/2005 | Todd et al. |
| 2005/0276233 A1 | 12/2005 | Shepard et al. |
| 2005/0282494 A1 | 12/2005 | Kossi et al. |
| 2006/0007927 A1 | 1/2006 | Lee et al. |
| 2006/0029060 A1* | 2/2006 | Pister ........................ 370/389 |
| 2006/0029061 A1* | 2/2006 | Pister et al. ................. 370/389 |
| 2006/0045016 A1 | 3/2006 | Dawdy et al. |
| 2006/0062192 A1 | 3/2006 | Payne |
| 2006/0067280 A1 | 3/2006 | Howard et al. |
| 2006/0077917 A1 | 4/2006 | Brahmajosyula et al. |
| 2006/0120384 A1 | 6/2006 | Boutboul et al. |
| 2006/0174017 A1 | 8/2006 | Robertson |
| 2006/0182076 A1 | 8/2006 | Wang |
| 2006/0213612 A1 | 9/2006 | Perron et al. |
| 2006/0215582 A1 | 9/2006 | Castagnoli et al. |
| 2006/0245440 A1 | 11/2006 | Mizukoshi |
| 2006/0253584 A1 | 11/2006 | Dixon et al. |
| 2007/0016724 A1 | 1/2007 | Gaither et al. |
| 2007/0070943 A1 | 3/2007 | Livet et al. |
| 2007/0074489 A1 | 4/2007 | Erhardt et al. |
| 2007/0076600 A1 | 4/2007 | Ekl et al. |
| 2007/0078995 A1 | 4/2007 | Benard et al. |
| 2007/0109592 A1 | 5/2007 | Parvathaneni et al. |
| 2007/0118604 A1 | 5/2007 | Costa Requena |
| 2007/0121531 A1 | 5/2007 | Lee et al. |
| 2007/0140245 A1 | 6/2007 | Anjum et al. |
| 2007/0143392 A1 | 6/2007 | Choe et al. |
| 2007/0161371 A1 | 7/2007 | Dobrowski et al. |
| 2007/0237094 A1 | 10/2007 | Bi et al. |
| 2007/0243879 A1 | 10/2007 | Park et al. |
| 2007/0280144 A1 | 12/2007 | Hodson et al. |
| 2007/0280286 A1 | 12/2007 | Hodson et al. |
| 2007/0282463 A1 | 12/2007 | Hodson et al. |
| 2007/0283030 A1 | 12/2007 | Deininger et al. |
| 2008/0075007 A1 | 3/2008 | Mehta et al. |
| 2008/0082636 A1 | 4/2008 | Hofmann et al. |
| 2008/0084852 A1 | 4/2008 | Karschnia |
| 2008/0098226 A1 | 4/2008 | Zokumasui |
| 2008/0117836 A1 | 5/2008 | Savoor et al. |
| 2008/0120676 A1 | 5/2008 | Morad et al. |
| 2008/0148296 A1 | 6/2008 | Chen et al. |
| 2008/0192812 A1 | 8/2008 | Naeve et al. |
| 2008/0198860 A1* | 8/2008 | Jain et al. .................... 370/401 |
| 2008/0215773 A1 | 9/2008 | Christison et al. |
| 2008/0285582 A1 | 11/2008 | Pister et al. |
| 2009/0059855 A1 | 3/2009 | Nanda et al. |
| 2009/0097502 A1 | 4/2009 | Yamamoto |
| 2009/0154481 A1* | 6/2009 | Han et al. .................... 370/406 |

FOREIGN PATENT DOCUMENTS

| | | |
|---|---|---|
| CN | 1804744 A | 7/2006 |
| EP | 1376939 A2 | 1/2004 |
| GB | 2 403 043 A | 12/2004 |
| JP | 2005143001 | 6/2005 |
| KR | 1020010076781 | 8/2001 |
| KR | 1020040048245 | 6/2004 |
| KR | 1020050028737 | 3/2005 |
| KR | 1020060066580 | 6/2006 |
| KR | 1020050016891 | 9/2006 |
| KR | 1020060111318 | 10/2006 |
| KR | 1020070026600 | 3/2007 |
| WO | WO-02/05199 A1 | 1/2002 |
| WO | WO-2005079026 A1 | 8/2005 |
| WO | WO-2005/096722 A2 | 10/2005 |
| WO | WO-2006121114 A1 | 11/2006 |

OTHER PUBLICATIONS

International Search Report and Written Opinion for corresponding International Application No. PCT/US08/04740 (Feb. 26, 2009).

Supplemental European Search Report for EP 08826312 dated Jun. 23, 2010.

Kastner et al., "Communication Systems for Building Automation and Control," Proceedings of the IEEE, vol. 93, No. 6, Jun. 1, 2005, pp. 1178-1203.

Thomesse, J., "Fieldbus Technology in Industrial Automation," Proceedings of the IEEE, vol. 93, No. 6, Jun. 1, 2005, pp. 1073-1101.

Cleveland, F., "IEC TC57 Security Standards for the Power System's Information Infrastructure—Beyond Simple Encryption," May 21, 2006, pp. 1-9.

European Search Report for EP 08826233 dated Jul. 23, 2010.

European Supplementary Search Report for European Patent Application No. 08 826 678.8 based on PCT/US2008/004750, dated Jun. 17, 2010.

Matkurbanov et al., "A Survey and Analysis of Wireless Fieldbus for Industrial Environments," SICE-ICCAS 2006 International Joint Conference, 5555-5561 (2006).

Lopez et al., "Wireless communications deployment in industry: a review of issues, options and technologies," Computers in Industry, Elsevier Science, 56:29-53 (2005).

Shen et al., "Wireless Sensor Networks for Industrial Applications," WCICA, 3636-3640 (2004).

Wong, "A Fuzzy-Decision-Based Routing Protocol for Mobile Ad Hoc Networks," Networks, 2002. ICON 2002. 10th IEEE International Conference on Aug. 27-30, 2002, Piscataway, NJ, USA, IEEE, Aug. 27, 2002, pp. 317-322.

Alandjani et al., "Fuzzy Routing in Ad Hoc Networks," Conference Proceedings fo the 2003 IEEE International Performance, Computing, and Communications Conference. Phoenix, AZ, Apr. 9-11, 2003, IEEE, vol. Conf. 22, Apr. 9, 2003, pp. 525-530.

Thomas et al., "Anthoc—QoS: Quality of 1-7 Service Routing in Mobile Ad Hoc Networks Using Swarm Intelligence" Mobile Technology, Applications and Systems, 2005 2nd International Conference on Guangzhou, China Nov. 15-17, 2005, Piscathaway, NJ, USA, IEEE, Piscathaway, NJ, USA Nov. 15, 2005, pp. 1-8.

"A Survey and Analysis of Wireless Field bus for Industrial Environments", Pulat Matkurbanov, SeungKi Lee, Dong-Sung Kim; Dept. of Electron. Eng., Kumoh Nat. Inst. Of Technol., Gumi. This paper appears in: SICE-ICASE, 2006. International Joint Conference: Issue Date: Oct. 18-21, 2006, on pp. 55555-5561; Print ISBN: 89-950038-4-7.

"D1100 SmartMesh Network Release 1.0 Engineering Software Specifications," Dust Networks, Dec. 17, 2011, 36 pages.

"D1100 SmartMesh Network Release 1.0 Engineering Software Specifications," Dust Networks, 36 pages. Dec. 17, 2011.

"Multiple Interpenetrating MultiDiGraphs," Dust Incorporated, 12 pages. (Powerpoint) Dec. 17, 2011.

"SmartMesh-XT CLI Commands Guide," Dust Networks, Inc., Jun. 27, 2007, 36 pages.

SmartMesh-XT KT1030/KT2135/KT2030 Evaluation Kit Guide, Dust Networks, Inc., Nov. 2, 2007, 58 pages.

"SmartMesh-XT M2135-2, M2030-2 2.4 GHz Wireless Analog/Digital/Serial Motes," Dust Networks, Inc., Mar. 28, 2007, 33 pages.

SmartMesh-XT Manager XML API Guide, Dust Networks, Inc., Apr. 4, 2007, 148 pages.

"System Description for Security Review SmartMesh Alba," Dust Networks, 36 pages.

Berlemann, Software Defined Protocols Based on Generic Protocol Functions for Wired and Wireless Networks, Nov. 2033, RWTH Aachen University. (Nov. 2009).

Qu et al., "A web-enabled distributed control application platform for industrial automation", Emerging Technologies and Factory Automation, Proceedings, 2:129-32 (Sep. 16, 2003).

Willig (ed.), "An architecture for wireless extension of PROFIBUS", IECON 2003—Proceedings of the 29th Annual Conference of the IEEE Industrial Electronics Society, New York, vol. 3, pp. 2369-2375 (Nov. 2-6, 2003).

Zheng, "ZigBee wireless sensor network in industrial applications", SICE-ICCAS 2006 International Joint Conference, IEEE, New Jersey, pp. 1067-1070 (Oct. 1, 2006).

Chinese Office Action for 200880018849.1 mailed Oct. 10, 2011.

Deering et al., "Internet Protocol, Version 6 (IPv6) Specification; rfc1883.txt", IETF Standard, Internet Engineering Task Force, IETF, Ch, Dec. 1, 1995, XP015007667.

European Search Report for 08826296.9 mailed Jan. 16, 2012.

* cited by examiner

ROUTING PACKETS ON A NETWORK USING DIRECTED GRAPHS

CROSS-REFERENCE TO RELATED APPLICATIONS

This application is based on and claims the benefit of priority to U.S. Provisional Application No. 60/911,795, entitled "Routing, Scheduling, Reliable and Secure Operations in a Wireless Communication Protocol" filed Apr. 13, 2007, the entire disclosure of which is hereby expressly incorporated herein by reference.

FIELD OF TECHNOLOGY

This patent relates generally to communication protocols and, more particularly, to a method of routing packets between nodes of a mesh or a star mesh network.

BACKGROUND

Communication protocols rely on various routing techniques to transfer data between communication endpoints on a communication network. Communication or network protocols and the corresponding routing strategies are typically selected in view of such factors as knowledge of network topology, size of the network, type of medium used as a signal carrier, security and reliability requirements, tolerable transmission delays, and types of devices forming the network. Due to a large number of such factors, a typical routing technique meets some of the design objectives at the expense of the others. For example, a certain routing technique may provide a high level of reliability in data delivery but may also require a relatively high overhead. Thus, while there are many known approaches to routing and many protocols compatible with these routing methods, there remain communication networks with the specific requirements that are not fully satisfied by any of the available routing methods and protocols. Moreover, as new types of communication networks, with the increasing demands for efficiency, throughput, and reliability, emerge in various industrial and commercial applications, the architects and developers frequently encounter new problems which are not easily addressed by the existing protocols and the associated routing techniques.

Generally speaking, a communication network includes nodes which are the senders and recipients of data sent over communication paths (either hardwired or wireless communication paths) connecting the nodes. Additionally, communication networks typically include dedicated routers responsible for directing traffic between nodes, and, optionally, include dedicated devices responsible for configuring and managing the network. Some or all of the nodes may be also adapted to function as routers so as to direct traffic sent between other network devices. Network devices may be inter-connected in a wired or wireless manner, and network devices may have different routing and transfer capabilities than certain nodes within the network. For example, dedicated routers may be capable of high volume transmissions while some nodes may only be capable of sending and receiving relatively little traffic over the same period of time. Additionally, the connections between nodes on a network may have different throughput capabilities and different attenuation characteristics. A fiber-optic cable, for example, may be capable of providing a bandwidth several orders of magnitude higher than a wireless link because of the difference in the inherent physical limitations of the medium.

In order for a node to send data to another node on a typical network, either the complete path from the source to the destination or the immediately relevant part of the path must be known. For example, the World Wide Web (WWW) allows pairs of computer hosts to communicate over large distances without either host knowing the complete path prior to sending the information. Instead, hosts are configured with the information about their assigned gateways and dedicated routers. In particular, the Internet Protocol (IP) provides network layer connectivity to the WWW. The IP defines a subprotocol known as Address Resolution Protocol (ARP) which provides a local table at each host specifying the routing rules. Thus, a typical host connected to the WWW or a similar Wide Area Network (WAN) may know to route all packets with the predefined addresses matching a pre-configured pattern to host A and route the rest of the packets to host B. Similarly, the intermediate hosts forwarding the packets, or "hops," also execute partial routing decisions and typically direct data in the general direction of the destination.

In most network protocols, most or all network devices are assigned sufficiently unique addresses to enable hosts to exchange information in an unambiguous manner. At least in case of unicast (one-to-one) transmissions, the destination address must be specified at the source. For this reason, network protocols typically define a rigid addressing scheme. As one of ordinary skill in the art will recognize, modifying or expanding addressing schemes is a complicated and expensive process. For example, the transition from version 4 of the IP protocol (IPv4) to version 6 (IPv6) requires significant updates to much of the infrastructure supporting IPv4. On the other hand, defining addressing schemes with large capability for small networks creates an unnecessary overhead. Thus, a network protocol ideally suited for a particular application offers a sufficient number of possible addresses without an excessive overhead in data transmission.

In short, there is a number of factors influencing the implementation of particular protocols in particular industries. In the process control industry, it is known to use standardized communication protocols to enable devices made by different manufacturers to communicate with one another in an easy to use and implement manner. One such well known communication standard used in the process control industry is the Highway Addressable Remote Transmitter (HART) Communication Foundation protocol, referred to generally as the HART® protocol. Generally speaking, the HART protocol supports a combined digital and analog signal on a dedicated wire or set of wires, in which on-line process signals (such as control signals, sensor measurements, etc.) are provided as an analog current signal (e.g., ranging from 4 to 20 milliamps) and in which other signals, such as device data, requests for device data, configuration data, alarm and event data, etc., are provided as digital signals superimposed or multiplexed onto the same wire or set of wires as the analog signal. However, the HART protocol currently requires the use of dedicated, hardwired communication lines, resulting in significant wiring needs within a process plant.

There has been a move, in the past number of years, to incorporate wireless technology into various industries including, in some limited manners, the process control industry. However, there are significant hurdles in the process control industry that limit the full scale incorporation, acceptance and use of wireless technology. In particular, the process control industry requires a completely reliable process control network because loss of signals can result in the loss of control of a plant, leading to catastrophic consequences, including explosions, the release of deadly chemicals or gases, etc. For example, Tapperson et al., U.S. Pat. No. 6,236, 334 discloses the use of a wireless communications in the process control industry as a secondary or backup communication path or for use in sending non-critical or redundant communication signals. Moreover, there have been many advances in the use of wireless communication systems in general that may be applicable to the process control industry, but which have not yet been applied to the process control industry in a manner that allows or provides a reliable, and in some instances completely wireless, communication network within a process plant. U.S. Patent Application Publication Numbers 2005/0213612, 2006/0029060 and 2006/0029061 for example disclose various aspects of wireless communication technology related to a general wireless communication system.

Similar to wired communications, wireless communication protocols are expected to provide efficient, reliable and secure methods of exchanging information. Of course, much of the methodology developed to address these concerns on wired networks does not apply to wireless communications because of the shared and open nature of the medium. Further, in addition to the typical objectives behind a wired communication protocol, wireless protocols face other requirements with respect to the issues of interference and co-existence of several networks that use the same part of the radio frequency spectrum. Moreover, some wireless networks operate in the part of the spectrum that is unlicensed, or open to the public. Therefore, protocols servicing such networks must be capable of detecting and resolving issues related to frequency (channel) contention, radio resource sharing and negotiation, etc.

In the process control industry, developers of wireless communication protocols face additional challenges, such as achieving backward compatibility with wired devices, supporting previous wired versions of a protocol, providing transition services to devices retrofitted with wireless communicators, and providing routing techniques which can ensure both reliability and efficiency. Meanwhile, there remains a wide number of process control applications in which there are few, if any, in-place measurements. Currently these applications rely on observed measurements (e.g. water level is rising) or inspection (e.g. period maintenance of air conditioning unit, pump, fan, etc) to discover abnormal situations. In order to take action, operators frequently require face-to-face discussions. Many of these applications could be greatly simplified if measurement and control devices were utilized; however, current measurement devices usually require power, communications infrastructure, configuration, and support infrastructure which simply is not available.

In yet another aspect, the process control industry requires that the communication protocol servicing a particular process control network be able to route data reliably and efficiently. On the other hand, the communication protocol should preferably allow sufficient flexibility with respect to transmitting different types of data. In particular, a process control network may transmit data related to device diagnostics, process variable measurements, alarms or alerts, device or loop configuration data, network management data, etc. These types of data may have different latency and reliability requirements, and may be associated with different amounts of information transmitted per unit of time.

SUMMARY

A hardware or software management entity residing in or outside a communications network including several network devices develops a routing scheme for the network by analyzing the topology of the network, defining a set of graphs for use in routing or transmitting data between various nodes of the network, each graph including one or more communication paths between pairs of network devices, and assigns a unique graph identifier to each graph. In some embodiments, the network is a wireless network and the graphs are directed graphs and, accordingly, the communication paths are unidirectional communication paths. In some embodiments, the network is a mesh network including network devices that originate and route data on behalf of other network devices. In a still further embodiment, the network conforms to a star mesh topology, in which some network devices can only receive data or originate data and some network devices can receive data, originate data, and relay data between other network devices.

Upon defining the set of graphs, the management entity communicates the relevant routing information to some or all network devices (nodes) so that a packet sent from one network device to another network device can be properly routed through the network according to the graph identifier included in the header or in the trailer of the data packet. In one aspect, the management entity improves the security of the network by not informing some or all of the network devices of a complete topology of the network. In another embodiment, the function of analyzing the network and obtaining the topology of the network is distributed among at least several network devices so that one or more network devices participate in defining unidirectional or bidirectional graphs. In a still further embodiment, the relevant routing information communicated to each network device includes a list of graph identifiers and, for each graph identifier, one or more of the neighboring devices which serves as possible next hops in the identified communication path (or "route"). In this embodiment, a network device may participate in "graph routing" by associating a graph identifier with a data packet, including the graph identifier in the header or trailer of the data packet, and sending the data packet to a destination device without specifying any additional routing information. An intermediate device, or a "hop" in the communication path, may properly route the data packet by processing only the graph identifier supplied with the data packet. In one embodiment, multiple non-identical graphs are defined between some or all of the pairs of devices for redundancy and increased reliability. In one embodiment, the management entity responsible, in part, for defining unidirectional graphs is a dedicated network manager and may be implemented as a software module run on a host residing in or outside of the network. In another embodiment, the network manager may be a dedicated physical device communicatively coupled to the network. In yet another embodiment, the network manager may be distributed among several devices residing in or outside of the network.

In an embodiment, a pair of communicating devices may include a gateway adapted to communicate with another network or a non-network host in addition to a network device. In accordance with this embodiment, directed graphs are defined in a downstream (from gateway to device) direction and in an upstream (from device to gateway) direction. In some embodiments, the graph including a downstream path from a gateway to a network device and the graph including an upstream path from the network device to the gateway are not symmetrical. In some embodiments, the network may include multiple network access points and redundant gateways. Additionally, the paths defined by the routes may be compatible with different transmission schedules and may be configured independently of allocating wireless resources to the transmitting and listening devices.

If desired, the wireless network may operate in a process control environment to support communications between wireless field devices, legacy field devices coupled to wireless adapters, portable monitoring devices, a gateway device providing access to one or more operator workstations, and other devices. Some or all of the devices participating in the wireless network report one, all, or any combination of process control measurements, diagnostic data, device management data, configuration data, network management data, etc. If desired, the wireless network applies the same routing techniques to each type of data, formats each type of data into data packets, and uses the same layer of a corresponding protocol stack to route the data packets of each type.

The wireless network may additionally implement source routing to allow a source network device to specify a complete deterministic communication path to a destination network device. In accordance with this feature, the management entity such as the network manager communicates a partial or a complete topology of the network to the network device so that the network device may specify each intermediate device in a communication path to a destination device. If desired, the network devices configured for both graph routing and source routing may select between graph routing and source routing according to a latency requirement of a packet. Additionally or alternatively, these network devices may select between graph routing and source routing according to a reliability requirement of the data packet. If desired, when the network is implemented in a process control environment, the network may select between graph routing and source routing based on whether a data packet is associated with process control or management data.

DETAILED DESCRIPTION OF THE DRAWINGS

FIG. 1 schematically illustrates a wireless network, connected to a plant automation network via a gateway device, providing communication between field devices and router devices and utilizing the routing techniques of the present disclosure.

Figure 1:
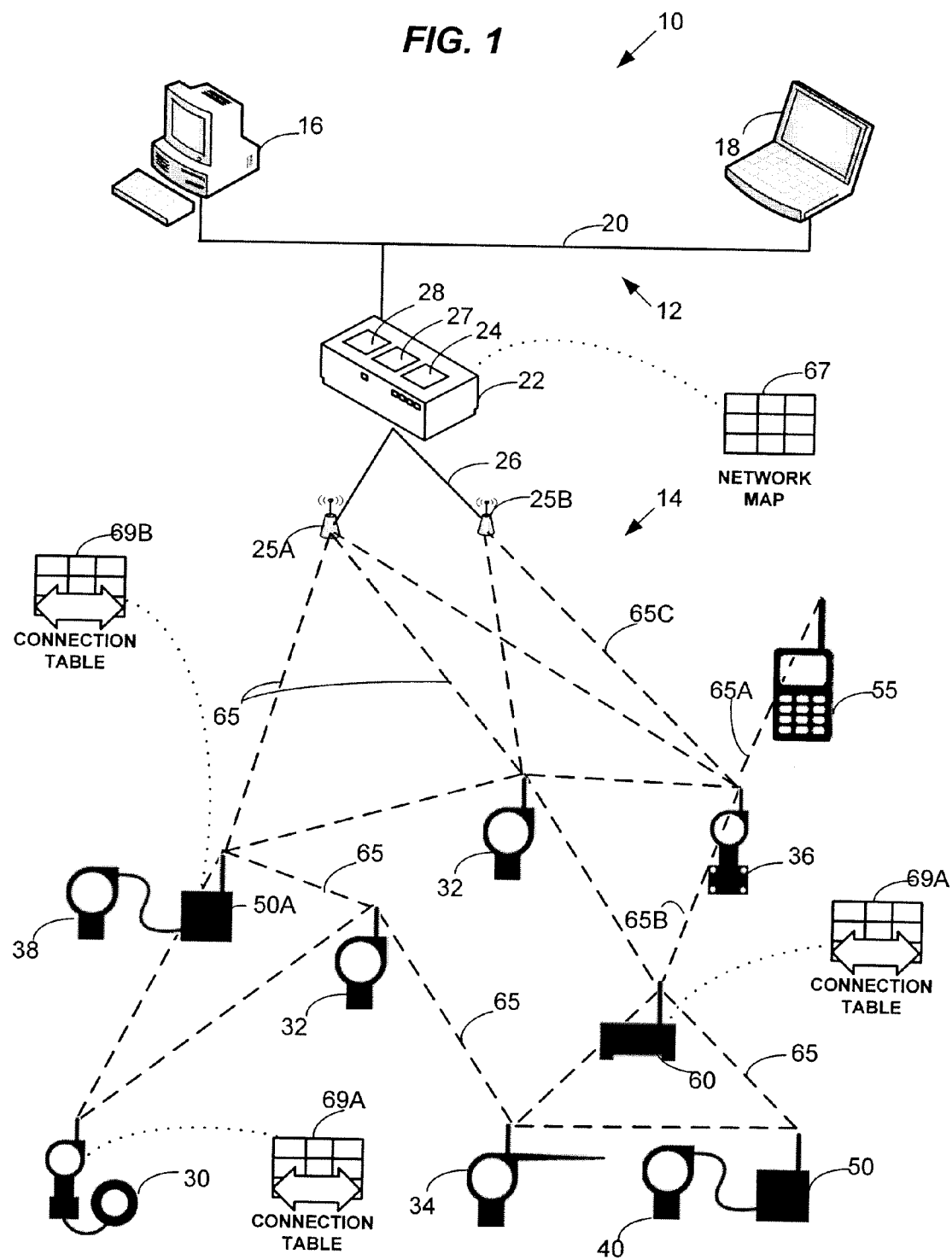
Figure 3:
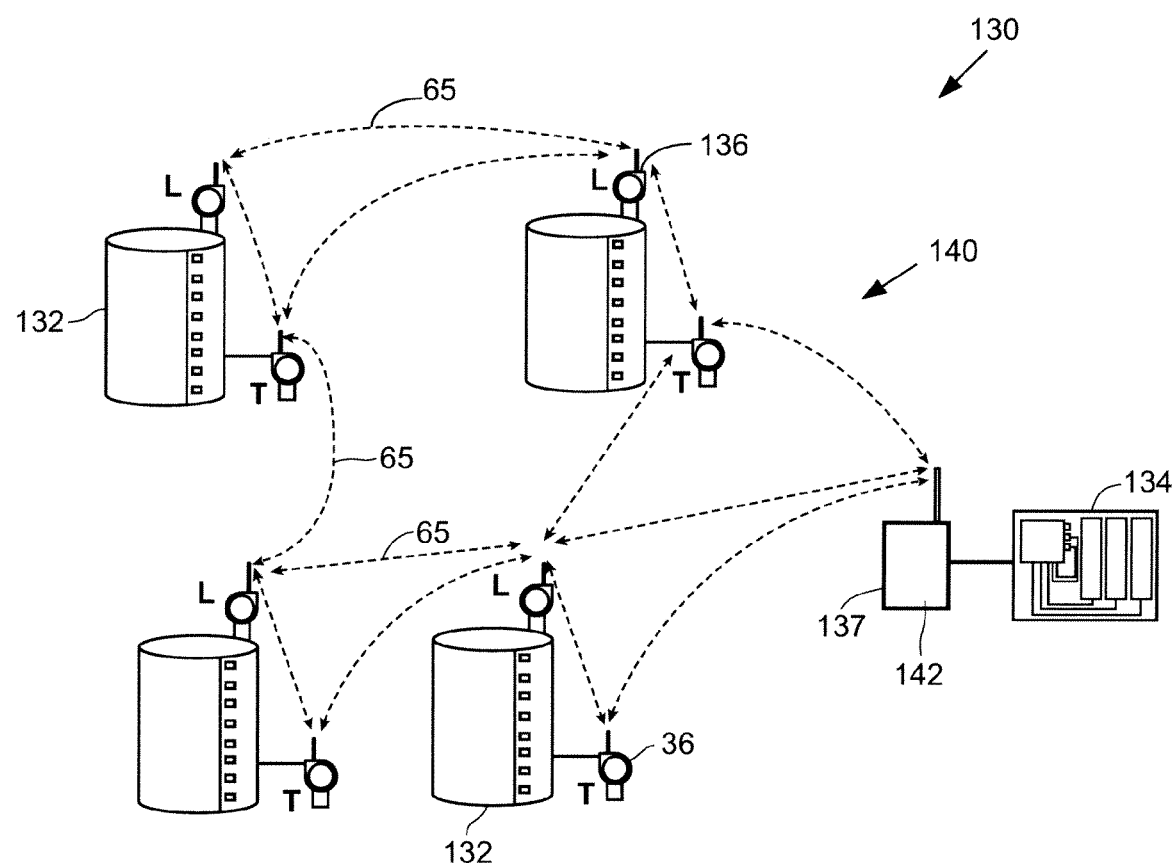
FIG. 3 illustrates a specific example of providing communications between field devices in a tank farm by using the routing techniques of the present disclosure in a wireless mesh network.
Figure 4:
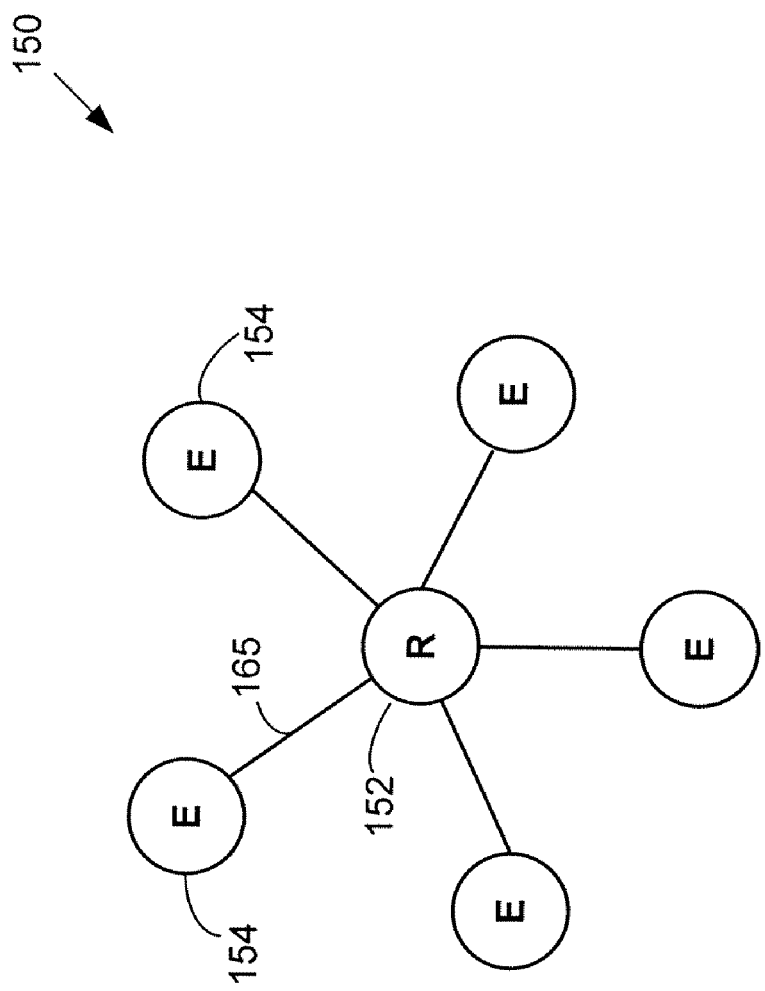

FIG. 4 schematically illustrates a star network topology to which a wireless network such as the network illustrated in FIG. 1 or FIG. 3 may conform.

Figure 5:
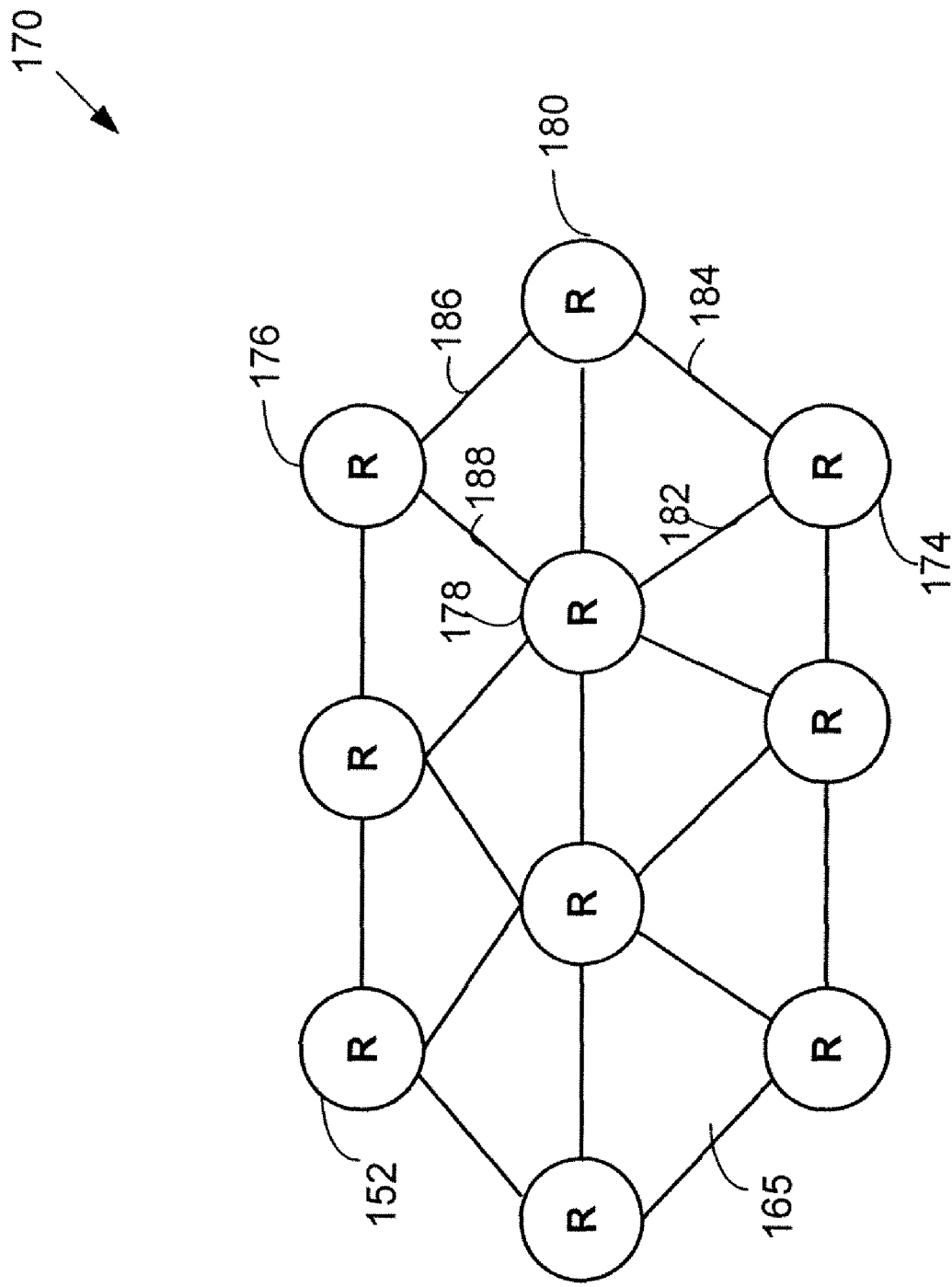

FIG. 5 schematically illustrates a mesh network topology to which a wireless network such as the network illustrated in FIG. 1 or FIG. 3 may conform.

Figure 6:
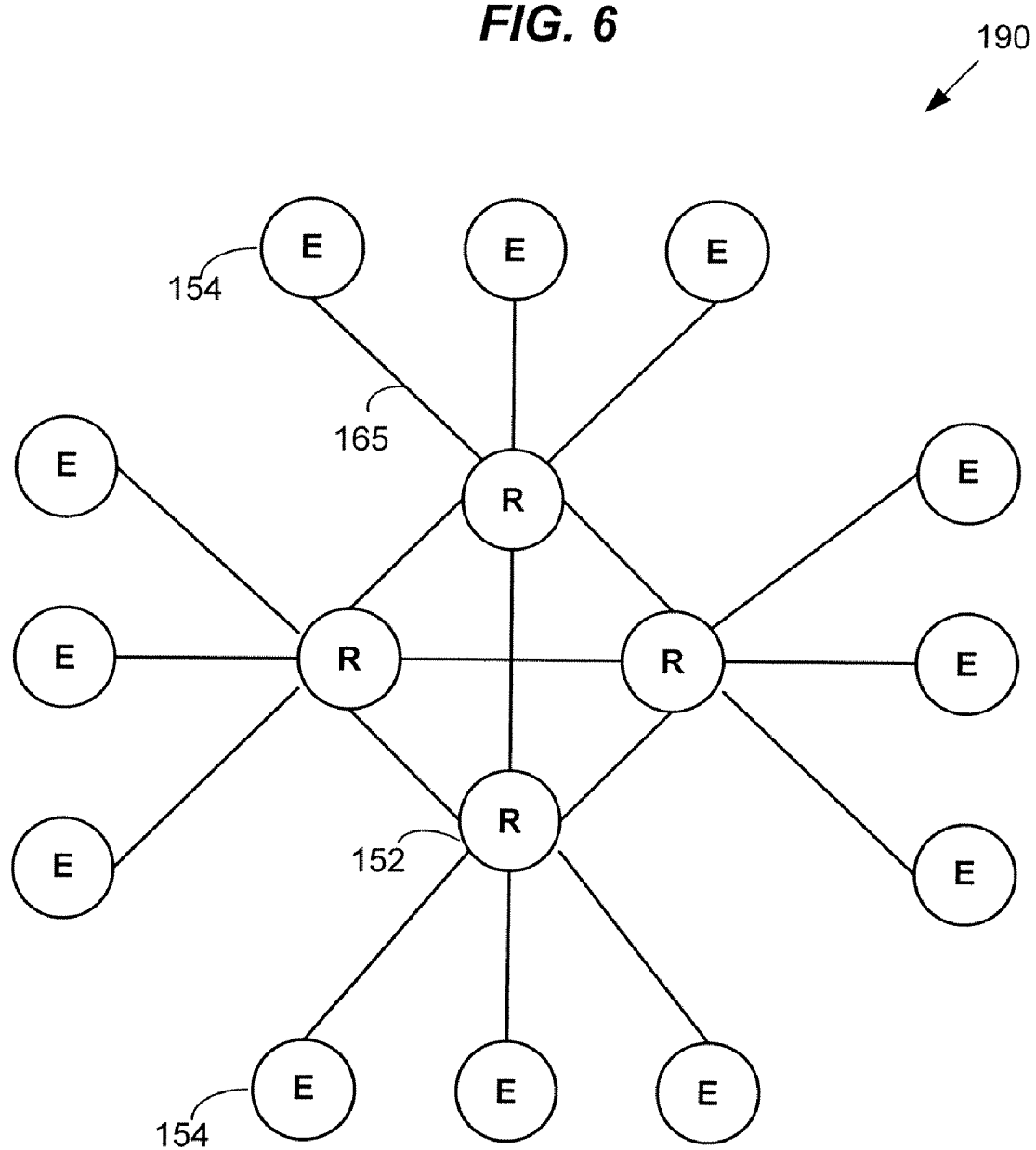

FIG. 6 schematically illustrates a star mesh network topology to which a wireless network such as the network illustrated in FIG. 1 or FIG. 3 may conform.

Figure 7:
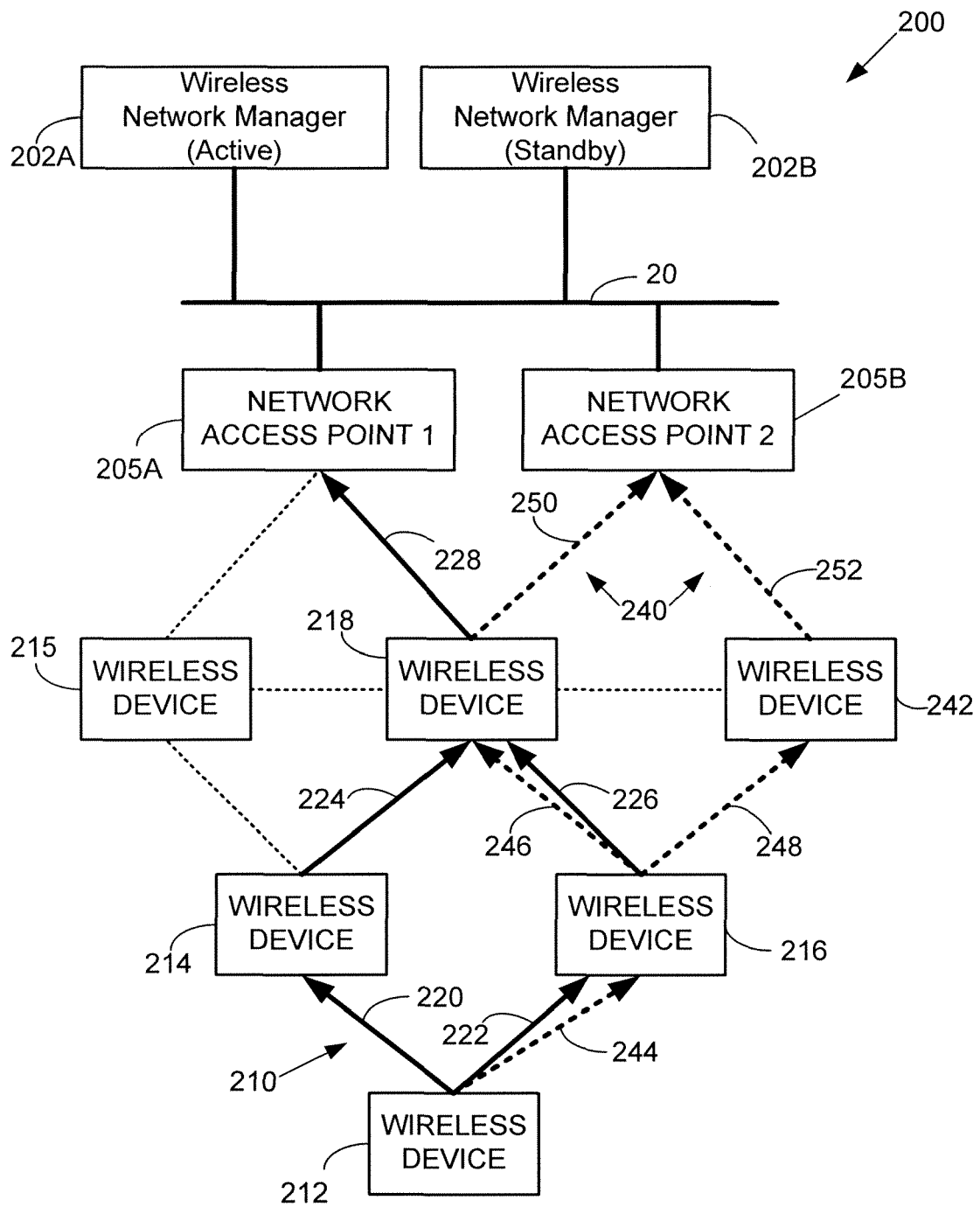

FIG. 7 is a block diagram illustrating redundant upstream data paths in a wireless network utilizing some of the graph routing techniques of the present disclosure.

Figure 8:
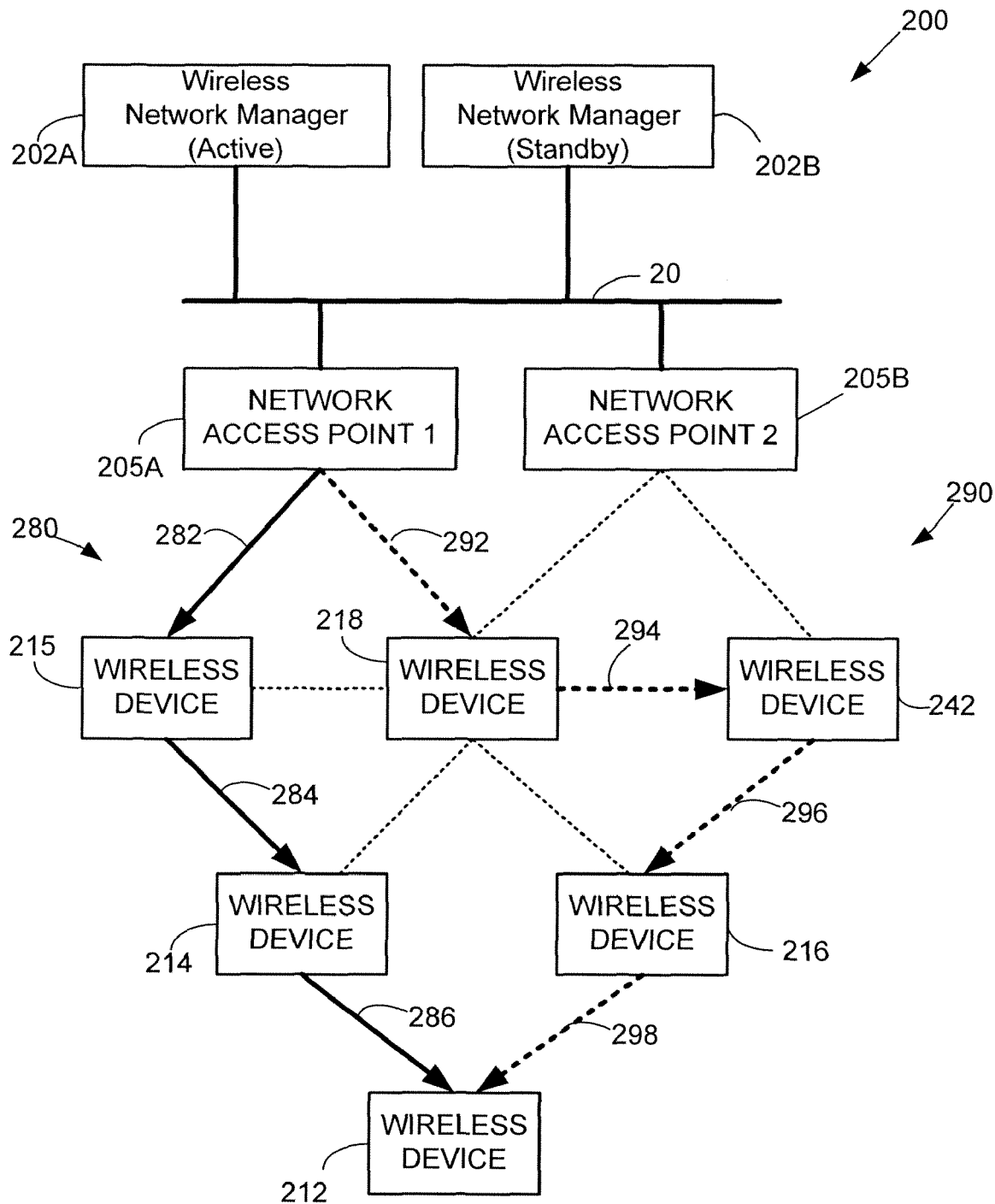

FIG. 8 is a block diagram illustrating redundant downstream data paths in a wireless network utilizing some of the graph routing techniques of the present disclosure.

Figure 9:
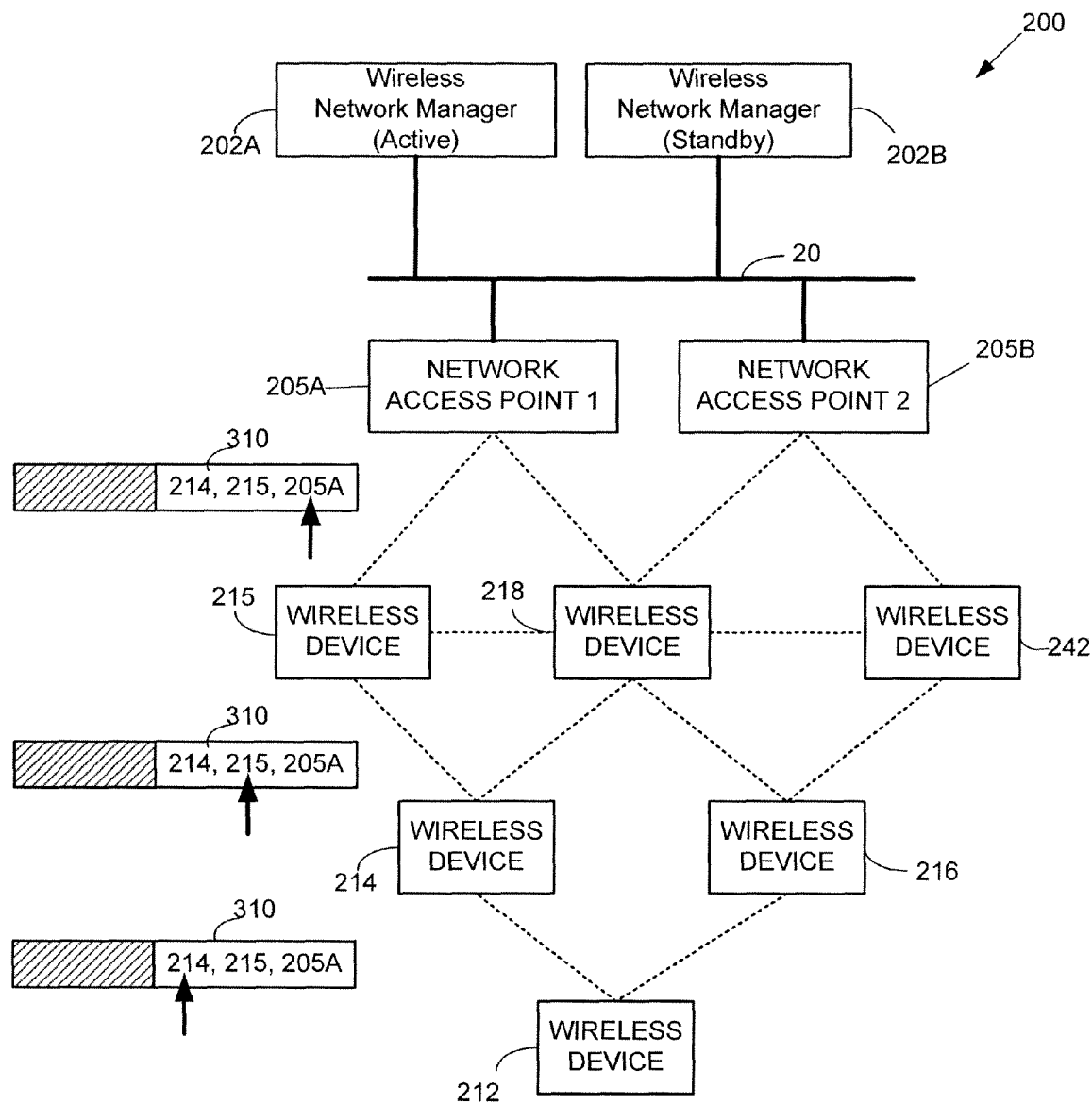

FIG. 9 is a block diagram illustrating downstream and upstream data paths in a wireless network utilizing some of the source routing techniques of the present disclosure.

Figure 10:
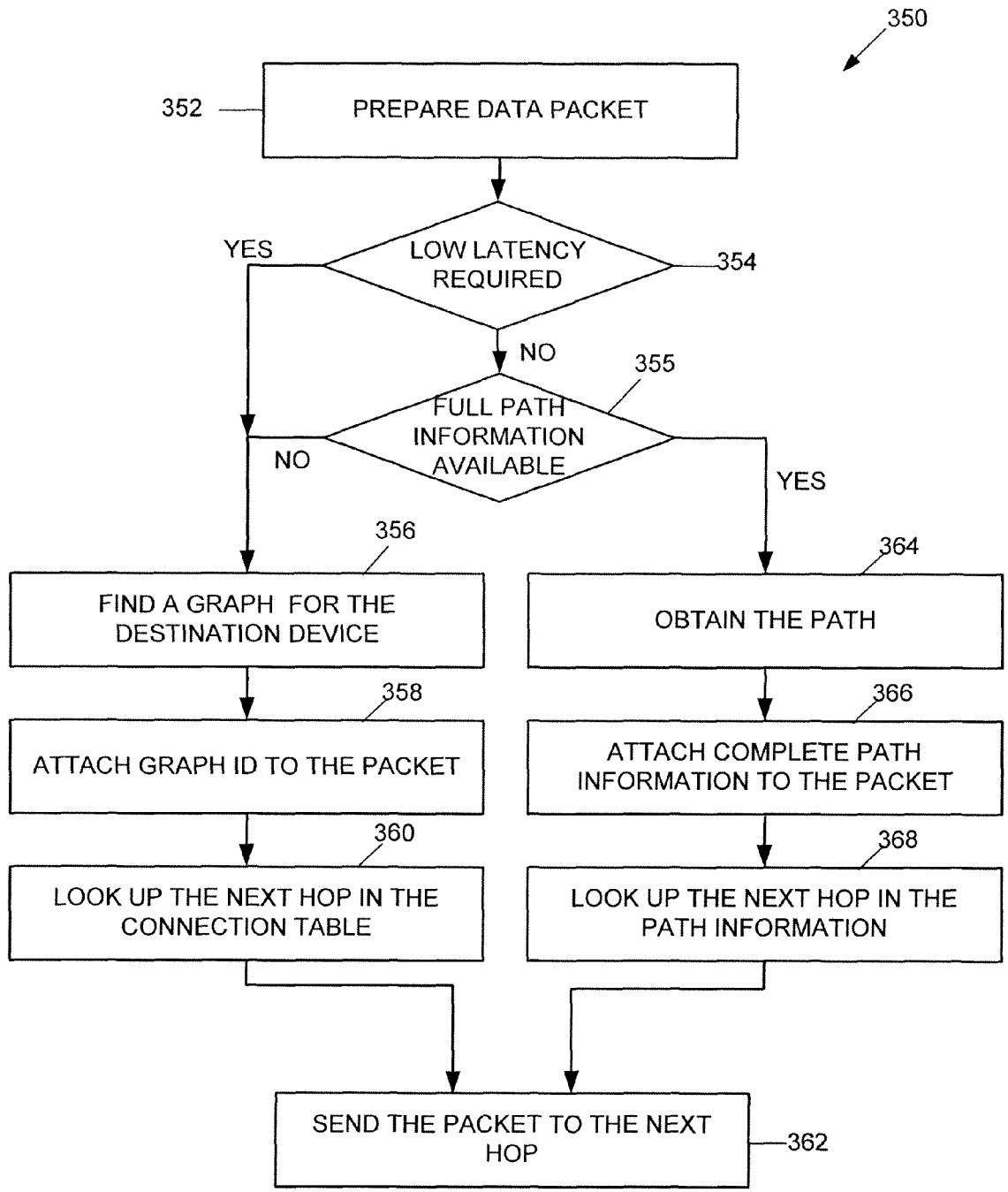

FIG. 10 is an example procedure that a device operating in a wireless network illustrated in FIG. 1 or 3 may execute to send a data packet to another device in the wireless network.

Figure 11:
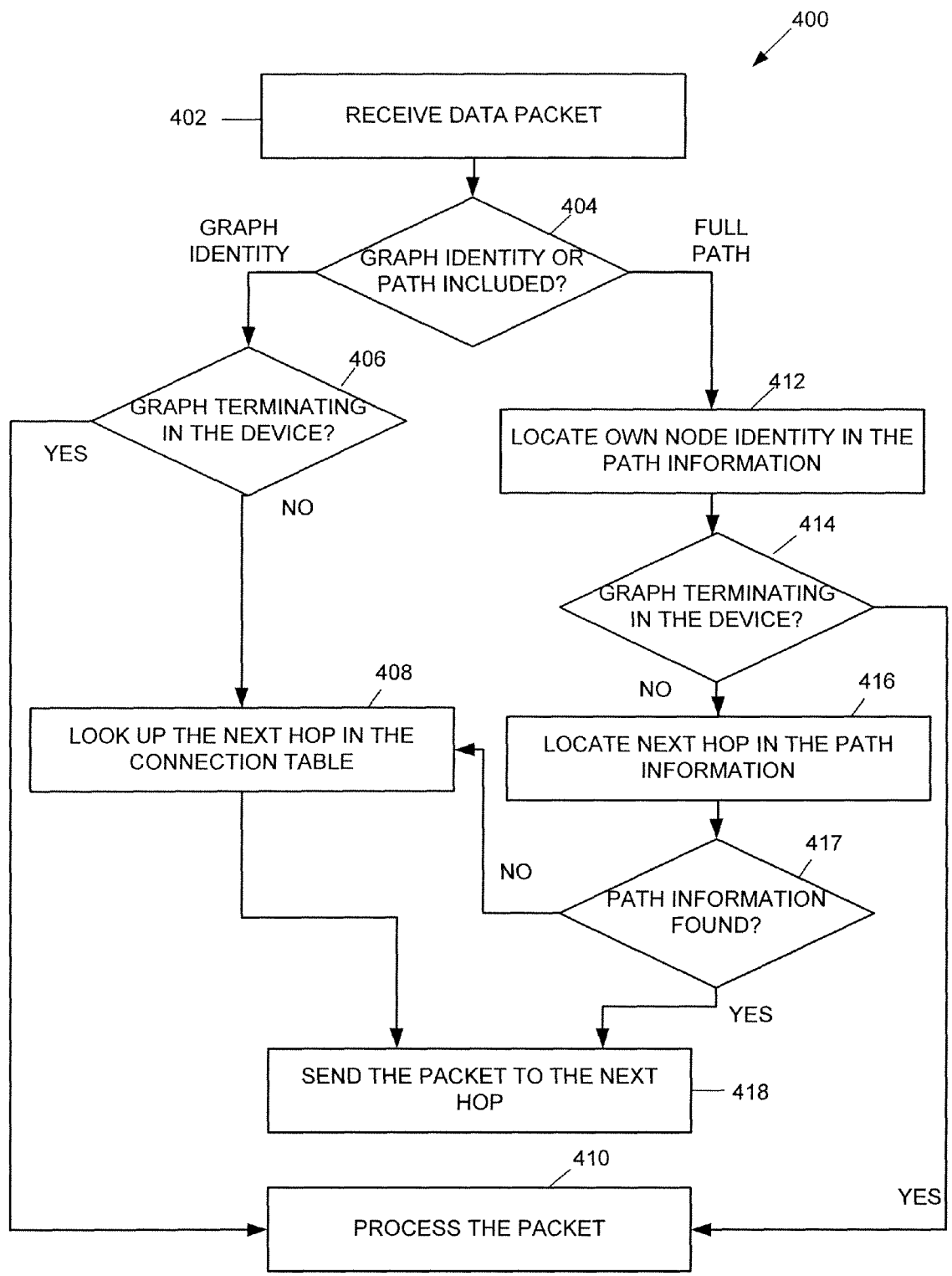

FIG. 11 is an example procedure that a device operating in a wireless network illustrated in FIG. 1 or 3 may execute to route a data packet sent by another device in the wireless network.

DETAILED DESCRIPTION

FIG. 1 illustrates an exemplary communication network 10 in which the communication routing techniques described herein may be used. In particular, the network 10 may include a plant automation/control network 12 connected to a wireless communication network 14. The plant automation network 12 may include one or more stationary workstations 16 and one or more portable workstations 18 connected over a communication backbone 20 which may be implemented using Ethernet, RS-485, Profibus DP, or any other suitable communication hardware and protocol. The workstations 16, 18 and other equipment forming the plant automation network 12 may provide various control and supervisory functions to plant personnel, including providing access to devices in the wireless network 14. The plant automation/control network 12 and the wireless network 14 may be connected via a gateway device 22. More specifically, the gateway device 22 may be connected to the backbone 20 in a wired manner and may communicate with the plant automation/control network 12 using any suitable (e.g., known) communication protocol. The gateway device 22, which may be implemented in any other desired manner (e.g., as a standalone device, a card insertable into an expansion slot of the host workstations 16 or 18, as a part of the input/output (IO) subsystem of a PLC-based or DCS-based system, etc.), may provide applications that are running on the network 12 with access to various devices of the wireless network 14. In addition to protocol and command conversion, the gateway device 22 may provide synchronized clocking used by time slots and superframes (sets of communication time slots spaced equally in time) of a scheduling scheme associated with a wireless protocol implemented in the wireless network 14.

In some configurations, the network 10 may include more than one gateway device 22 to improve the efficiency and reliability of the network 10. In particular, multiple gateway devices 22 may provide additional bandwidth for the communication between the wireless network 14 and the plant automation network 12, as well as the outside world. On the other hand, the gateway device 22 may request bandwidth from the appropriate network service according to the gateway communication needs within the wireless network 14. The gateway device 22 may further reassess the necessary bandwidth while the communication system is operational. For example, the gateway device 22 may receive a request from a host residing outside of the wireless network 14 to retrieve a large amount of data. The gateway device 22 may then request additional bandwidth from a dedicated service to accommodate this transaction. The gateway device 22 may also or at some later time request the release of the unnecessary bandwidth upon completion of the transaction.

To further increase bandwidth and improve reliability, the gateway device 22 may be functionally divided into a virtual gateway 24 and one or more network access points 25, which may be separate physical devices in wired communication with the gateway device 22. However, while FIG. 1 illustrates a wired connection 26 disposed between the physically separate gateway device 22 and the access points 25, it will be understood that the elements 22-26 may also be provided as an integral device. Because the network access points 25 may be physically separated from the gateway device 22, the access points 25 may be strategically placed in several different locations with respect to the wireless network 14. In addition to increasing the bandwidth, the use of multiple access points 25 can increase the overall reliability of the wireless network 14 by compensating for a potentially poor signal quality at one access point 25 with the use of the other access point 25. Having multiple access points 25 also provides redundancy in case of a failure at one or more of the access points 25.

In addition to allocating bandwidth and otherwise bridging the networks 12 and 14, the gateway device 22 may perform one or more managerial functions in the wireless network 14. As illustrated in FIG. 1, a network manager software module 27 and a security manager software module 28 may be stored in and executed in the gateway device 22. Alternatively, the network manager 27 and/or the security manager 28 may run on one of the hosts 16 or 18 in the plant automation network 12. For example, the network manager 27 may run on the host 16 and the security manager 28 may run on the host 18. The network manager 27 may be responsible for configuration of the wireless network 14, scheduling communication between wireless devices, managing routing tables associated with the wireless devices, monitoring the overall health of the wireless network 14, reporting the health of the wireless network 14 to the workstations 16 and 18, as well as other administrative and supervisory functions. Although a single active network manager 27 may be sufficient in the wireless network 14, redundant network managers 27 may be similarly supported to safeguard the wireless network 14 against unexpected equipment failures. Meanwhile, the security manager 28 may be responsible for protecting the wireless network 14 from malicious or accidental intrusions by unauthorized devices. To this end, the security manager 28 may manage authentication codes, verify authorization information supplied by devices attempting to join the wireless network 14, update temporary security data such as expiring secret keys, and perform other security functions.

With continued reference to FIG. 1, the wireless network 14 may include one or more field devices 30-36. In general, process control systems, like those used in chemical, petroleum or other process plants, include field devices such as valves, valve positioners, switches, sensors (e.g., temperature, pressure and flow rate sensors), pumps, fans, etc. Generally speaking, field devices perform physical control functions within the process such as opening or closing valves or take measurements of process parameters. In the wireless communication network 14, field devices 30-36 are producers and consumers of wireless communication packets.

The devices 30-36 may communicate using a wireless communication protocol that provides the functionality of a similar wired network, with similar or improved operational performance. In particular, this protocol may enable the system to perform process data monitoring, critical data monitoring (with the more stringent performance requirements), calibration, device status and diagnostic monitoring, field device troubleshooting, commissioning, and supervisory process control. The applications performing these functions, however, typically require that the protocol supported by the wireless network 14 provide fast updates when necessary, move large amounts of data when required, and support network devices which join the wireless network 14, even if only temporarily for commissioning and maintenance work.

In one embodiment, the wireless protocol supporting network devices 30-36 of the wireless network 14 is an extension of the known wired HART protocol, a widely accepted industry standard, that maintains the simple workflow and practices of the wired environment. In this sense, the network devices 30-36 may be considered and will be referred to herein as WirelessHART devices, and the wireless network 14 accordingly may be considered a WirelessHART network. The same tools used for wired HART devices may be easily adapted to wireless devices 30-36 with a simple addition of new device description files. In this manner, the wireless protocol may leverage the experience and knowledge gained using the wired HART protocol to minimize training and to simplify maintenance and support. Generally speaking, it may be convenient to adapt a protocol for wireless use so that most applications running on a device do not "notice" the transition from a wired network to a wireless network. Clearly, such transparency greatly reduces the cost of upgrading networks and, more generally, reduces the cost associated with developing and supporting devices that may be used with such networks. Some of the additional benefits of a wireless extension of the well-known HART protocol include access to measurements that were difficult or expensive to obtain with wired devices and the ability to configure and operate instruments from system software that can be installed on laptops, handhelds, workstations, etc. Another benefit is the ability to send diagnostic alerts from wireless devices back through the communication infrastructure to a centrally located diagnostic center. For example, every heat exchanger in a process plant could be fitted with a WirelessHART device and the end user and supplier could be alerted when a heat exchanger detects a problem.

Yet another benefit is the ability to monitor conditions that present serious health and safety problems. For example, a WirelessHART device could be placed in flood zones on roads and be used to alert authorities and drivers about water levels. Other benefits include access to a wide range of diagnostics alerts and the ability to store trended as well as calculated values at the WirelessHART devices so that, when communications to the device are established, the values can be transferred to a host. In this manner, the WirelessHART protocol can provide a platform that enables host applications to have wireless access to existing HART-enabled field devices and the WirelessHART protocol can support the deployment of battery operated, wireless only HART-enabled field devices. The WirelessHART protocol may be used to establish a wireless communication standard for process applications and may further extend the application of HART communications and the benefits that this protocol provides to the process control industry by enhancing the basic HART technology to support wireless process automation applications.

Referring again to FIG. 1, the field devices 30-36 may be WirelessHART field devices, each provided as an integral unit and supporting all layers of the WirelessHART protocol stack. For example, in the wireless network 14, the field device 30 may be a WirelessHART flow meter, the field devices 32 may be WirelessHART pressure sensors, the field device 34 may be a WirelessHART valve positioner, and the field device 36 may a WirelessHART pressure sensor. Importantly, the wireless devices 30-36 may support all of the HART features that users have come to expect from the wired HART protocol. As one of ordinary skill in the art will appreciate, one of the core strengths of the HART protocol is its rigorous interoperability requirements. In some embodiments, all WirelessHART equipment includes core mandatory capabilities designed to allow equivalent device types (made by different manufacturers, for example) to be interchanged without compromising system operation. Furthermore, the WirelessHART protocol is backward compatible to HART core technology such as the device description language (DDL). In the preferred embodiment, all of the WirelessHART devices should support the DDL, which ensures that end users immediately have the tools to begin utilizing the WirelessHART protocol.

If desired, the wireless network 14 may include non-wireless devices. For example, a field device 38 of FIG. 1 may be a legacy 4-20 mA device and a field device 40 may be a traditional wired HART device. To communicate within the wireless network 14, the field devices 38 and 40 may be connected to the WirelessHART network 14 via a WirelessHART adapter (WHA) 50 or 50A. Additionally, the WHA 50 may support other communication protocols such as Foundation® Fieldbus, PROFIBUS, DeviceNet, etc. In these embodiments, the WHA 50 supports protocol translation on a lower layer of the protocol stack. Additionally, it is contemplated that a single WHA 50 may also function as a multiplexer and may support multiple HART or non-HART devices.

Plant personnel may additionally use handheld devices for installation, control, monitoring, and maintenance of network devices. Generally speaking, handheld devices are portable equipment that can connect directly to the wireless network 14 or through the gateway devices 22 as a host on the plant automation network 12. As illustrated in FIG. 1, a WirelessHART-connected handheld device 55 may communicate directly with the wireless network 14. When operating with a formed wireless network 14, the handheld device 55 may join the wireless network 14 as just another WirelessHART field device. When operating with a target network device that is not connected to a WirelessHART network, the handheld device 55 may operate as a combination of the gateway device 22 and the network manager 27 by forming its own wireless network with the target network device.

A plant automation network-connected handheld device (not shown) may be used to connect to the plant automation network 12 through known networking technology, such as Wi-Fi. This device communicates with the network devices 30-40 through the gateway device 22 in the same fashion as external plant automation servers (not shown) or in the same fashion that the workstations 16 and 18 communicate with the devices 30-40.

Additionally, the wireless network 14 may include a router device 60. The router device 60 is a network device that forwards packets from one network device to another network device. A network device that is acting as a router device uses internal routing tables to conduct routing, i.e., to decide to which network device a particular packet should be sent. Stand alone routers such as the router 60 may not be required in those embodiments where all of the devices on the wireless network 14 support routing. However, it may be beneficial (e.g. to extend the network, or to save the power of a field device in the network) to add one or more dedicated routers 60 to the network 14.

All of the devices directly connected to the wireless network 14 may be referred to as network devices. In particular, the wireless field devices 30-36, the adapters 50, the routers 60, the gateway devices 22, the access points 25, and the wireless handheld device 55 are, for the purposes of routing and scheduling, network devices, each of which forms a node of the wireless network 14. In order to provide a very robust and an easily expandable wireless network, all of the devices in a network may support routing and each network device may be globally identified by a substantially unique address, such as a HART protocol address, for example. Some or all of the network devices in the wireless network 14 may include a processor and a memory to store data, programmable instructions, and other information. The processing and storage capabilities of the network may vary significantly. It will be appreciated that the network devices may be made by different manufacturers or may represent different versions or generations of a particular device.

The network manager 27 may contain a complete list of network devices and may assign each device a short, network unique nickname. Additionally, each network device may store information related to update rates, connection sessions, and device resources. In short, each network device may maintain up-to-date information related to routing and scheduling within the wireless network 14. The network manager 27 may communicate this information to network devices whenever new devices join the network or whenever the network manager 27 detects or originates a change in topology or scheduling of the wireless network 14.

Further, each network device may store and maintain a list of neighbor devices that the network device has identified during listening operations. Generally speaking, a neighbor of a network device is another network device of any type potentially capable of establishing a communication connection with the network device in accordance with the standards imposed by a corresponding network. In case of the WirelessHART network 14, the connection is a direct wireless connection. However, it will be appreciated that a neighboring device may also be a network device connected to the particular device in a wired manner. As will be discussed later, network devices promote their discovery by other network devices through advertisement, or special messages sent out during designated periods of time. Network devices operatively connected to the wireless network 14 have one or more neighbors which they may choose according to the strength of the advertising signal or to some other principle.

In the example illustrated in FIG. 1, each of a pair of network devices connected by a direct wireless connection 65 recognizes the other as a neighbor. Thus, network devices of the wireless network 14 may form a large number of inter-device connections 65. The possibility and desirability of establishing a direct wireless connection 65 between two network devices is determined by several factors, such as the physical distance between the nodes, obstacles between the nodes (devices), signal strength at each of the two nodes, etc. Thus, each wireless connection 65 may be characterized by a large set of parameters related to the frequency of transmission, the method of access to a radio resource, etc. One of ordinary skill in the art will recognize that, in general, wireless communication protocols may operate on designated frequencies, such as the ones assigned by the Federal Communications Commission (FCC) in the United States, or in the unlicensed part of the radio spectrum (e.g., 2.4 GHz). While the system and method discussed herein may be applied to a wireless network operating on any designated frequency or range of frequencies, the example embodiment discussed below relates to the wireless network 14 operating in the unlicensed, or shared part of the radio spectrum. In accordance with this embodiment, the wireless network 14 may be easily activated and adjusted to operate in a particular unlicensed frequency range as needed.

With continued reference to FIG. 1, two or more direct wireless connections 65 may form a communication path between nodes that cannot form a direct wireless connection 65. For example, the direct wireless connection 65A between the WirelessHART hand-held device 55 and WirelessHART device 36, along with the direct wireless connection 65B between the WirelessHART device 36 and the router 60, may form a communication path between the devices 55 and 60. As discussed in greater detail below, at least some of the communication paths may be directed communication paths (i.e., permitting data transfer in only one direction between a pair of devices). Meanwhile, the WirelessHART device 36 may directly connect to each of the network devices 55, 60, 32, and to the network access points 25A and 25B. In general, network devices operating in the wireless network 14 may originate data packets, relay data packets sent by other devices, or perform both types of operations. As used herein, the term "end device" refers to a network device that does not relay data packets sent by other devices and term "routing device" refers to a network device that relays data packets traveling between other network devices. Of course, a routing device may also originate its own data. One or several end devices and routing devices, along with several direct connections 65, may thus form a part of a mesh network.

Because a process plant may have hundreds or even thousands of field devices, the wireless network 14 operating in the plant may include a large number of nodes and, in many cases, an even larger number of direct connections 65 between pairs of nodes. As a result, the wireless network 14 may have a complex mesh topology, and some pairs of devices that do not share a direct connection 65 may have to communicate through many intermediate hops to perform communications between these devices. Thus, a data packet may sometimes need to travel along many direct connections 65 after leaving a source device but before reaching a destination device, and each direct connection 65 may add a delay to the overall delivery time of the data packet. Moreover, some of these intermediate devices may be located at an intersection of many communication paths of a mesh network. As such, these devices may be responsible for relaying a large number of packets originated by many different devices, possibly in addition to originating its own data. Consequently, a relatively busy intermediate device may not forward a transient data packet immediately, and instead may queue the packet for a relatively significant amount of time prior to sending the packet to a next node in the corresponding communication path. When the data packet eventually reaches the destination device, the destination device may reply with an acknowledgement packet which may also encounter similar delays. During the time the packet travels to the destination device and the corresponding acknowledgment packet travels back to the originating device from the destination device, the originating node may not know whether the data packet has successfully reached the destination device. Moreover, devices may leave the wireless network 14 due to scheduled maintenance and upgrades or due to unexpected failures, thus changing the topology of the mesh network and destroying some of the communication paths. Similarly, the devices may join the wireless network 14, adding additional direct connections 65. These and other changes to the topology of the wireless network 14 may significantly impact data transmissions between pairs of nodes if not processed in an efficient and timely manner.

Importantly, however, the efficiency of delivering data packets may largely determine the reliability, security, and the overall quality of plant operations. For example, a data packet including measurements indicative of an excessive temperature of a reactor should quickly and reliably reach another node, such as the hand-held device 55, so that the operator or a controller may immediately take the appropriate action and address a dangerous condition if necessary. To efficiently utilize the available direct wireless connections 65 and properly adjust to the frequently changing network topology, the network manager 27 may maintain a complete network map 67, may define a routing scheme that connects at least some pairs of network devices 30-50, and may communicate the relevant parts of the routing scheme to each network device that participates in the routing scheme.

In particular, the network manage 27 may define a set of directed graphs including one or more unidirectional communication paths, assign a graph identifier to each defined directed graph, and may communicate a relevant part of each graph definition to each corresponding network device, which may then update the device-specific, locally stored connection table 69. As explained in more detail below, the network devices 30-50 may then route data packets based on the graph identifier included in the headers or the trailers of the data packets. If desired, each connection table 69 may only store routing information directly related to the corresponding network device, so that the network device does not know the complete definition of a directed graph which includes the network device. In other words, the network device may not "see" the network beyond its immediate neighbors and, in this sense, the network device may be unaware of the complete topology of the wireless network 14. For example, the router device 60 illustrated in FIG. 1 may store a connection table 69A, which may only specify the routing information related to the neighboring network devices 32, 36, 50, and 34. Meanwhile, the WHA 50A may store a connection table 69B, which accordingly may specify the routing information related to the neighbors of the WHA 50A.

In some cases, the network manager 27 may define duplicate communication paths between pairs of network devices to ensure that a data packet may still reach the destination device along the secondary communication path if one of the direct connections 65 of the primary communication path becomes unavailable. However, some of the direct connections 65 may be shared between the primary and the secondary path of a particular pair of network devices. Moreover, the network manager 27 may, in some cases, communicate the entire communication path to be used to a certain network device, which may then originate a data packet and include the complete path information in the header or the trailer of the data packet. Preferably, network devices use this method of routing for data which does not have stringent latency requirements. As discussed in detail below, this method (referred to herein as "source routing") may not provide the same degree of reliability and flexibility and, in general, may be characterized by longer delivery delays.

The network manager 27 may also manage the available radio resources. In particular, the network manager 27 may partition the radio bandwidth allocated to the wireless network 14 into individual communication channels, and further measure transmission and reception opportunities on each channel in such units as Time Division Multiple Access (TDMA) communication timeslots, for example. In particular, the wireless network 14 may operate within a certain frequency band which, in most cases, may be safely associated with several distinct carrier frequencies, so that communications at one frequency may occur at the same time as communications at another frequency within the band. One of ordinary skill in the art will appreciate that carrier frequencies in a typical application (e.g., public radio) are sufficiently spaced apart to prevent interference between the adjacent carrier frequencies. For example, in the 2.4 GHz band, IEEE assigns frequency 2.455 to channel number 21 and frequency 2.460 to channel number 22, thus allowing the spacing of 5 KHz between two adjacent segments of the 2.4 GHz band. The complete network map 67 may thus associate each communication channel with a distinct carrier frequency, which may be the center frequency in a particular segment of the band.

Meanwhile, as typically used in the industries utilizing TDMA technology, the term "timeslot" refers to a segment of a specific duration into which a larger period of time is divided to provide a controlled method of bandwidth sharing. For example, a second may be divided into 10 equal 100 millisecond timeslots. Although the complete network map 67 preferably allocates resources as timeslots of a single fixed duration, it is also possible to vary the duration of the timeslots, provided that each relevant node of the wireless network 14 is properly notified of the change. To continue with the example definition of ten 100-millisecond timeslots, two devices may exchange data every second, with one device transmitting during the first 100 ms period of each second (i.e., the first timeslot), the other device transmitting during the fourth 100 ms period of each second (i.e., the fourth timeslot), and with the remaining timeslots being unoccupied. Thus, a node on the wireless network 14 may identify the scheduled transmission or reception opportunity by the frequency of transmission and the timeslot during which the corresponding device may transmit or receive data.

Figure 2:
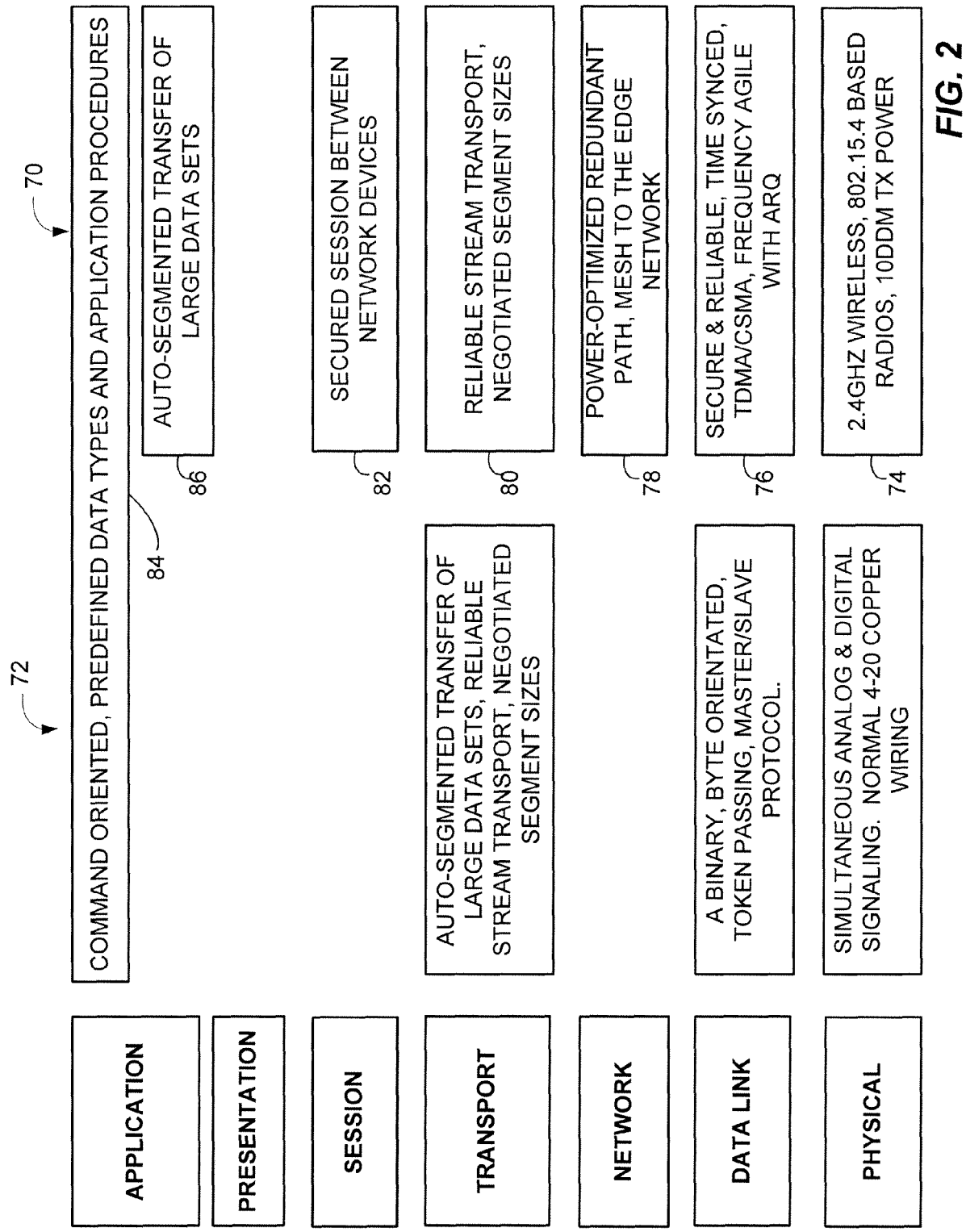
FIG. 2 is a schematic representation of the layers of a WirelessHART protocol which may be used in the wireless network illustrated in FIG. 1.

The communication protocol supporting the wireless network 14 generally described above is referred to herein as the WirelessHART protocol 70, and the operation of this protocol is discussed in more detail with respect to FIG. 2. However, it will be noted that the WirelessHART protocol 70 is presented herein by way of example only, and that a suitable protocol may be also defined without sharing one or more layers with the existing HART technology. In accordance with the example protocol stack described below, each of the direct wireless connections 65 may transfer data according to the physical and logical requirements of the WirelessHART protocol 70. Meanwhile, the WirelessHART protocol 70 may efficiently support communications within timeslots and along communication paths of the directed graphs defined by the network manager 27.

FIG. 2 schematically illustrates the layers of one example embodiment of the WirelessHART protocol 70, approximately aligned with the layers of the well-known ISO/OSI 7-layer model for communications protocols. By way of comparison, FIG. 2 additionally illustrates the layers of the existing "wired" HART protocol 72. It will be appreciated that the WirelessHART protocol 70 need not necessarily have a wired counterpart. However, as will be discussed in detail below, the WirelessHART protocol 70 can significantly improve the convenience of its implementation by sharing one or more upper layers of the protocol stack with an existing protocol. As indicated above, the WirelessHART protocol 70 may provide the same or greater degree of reliability and security as the wired protocol 72 servicing a similar network. At the same time, by eliminating the need to install wires, the WirelessHART protocol 70 may offer several important advantages, such as the reduction of cost associated with installing network devices, for example. It will be also appreciated that although FIG. 2 presents the WirelessHART protocol 70 as a wireless counterpart of the HART protocol 72, this particular correspondence is provided herein by way of example only. In other possible embodiments, one or more layers of the WirelessHART protocol 70 may correspond to other protocols or, as mentioned above, the WirelessHART protocol 70 may not share even the uppermost application layer with any of the existing protocols.

As illustrated in FIG. 2, the wireless expansion of HART technology may add at least one new physical layer (e.g., the IEEE 802.15.4 radio standard) and two data-link layers (e.g., wired and wireless mesh) to the known HART implementation. In general, the WirelessHART protocol 70 may be a secure, wireless mesh networking technology operating in the 2.4 GHz ISM radio band (block 74). If desired, the WirelessHART protocol 70 may utilize IEEE 802.15.4b compatible direct sequence spread spectrum (DSSS) radios with channel hopping on a transaction by transaction basis. This WirelessHART communication may be arbitrated using TDMA to schedule link activity (block 76). As such, all communications are preferably performed within a designated time slot. One or more source and one or more destination devices may be scheduled to communicate in a given slot, and each slot may be dedicated to communication from a single source device, or the source devices may be scheduled to communicate using a CSMA/CA-like shared communication access mode. Source devices may send messages to one or more specific target devices or may broadcast messages to all of the destination devices assigned to a slot.

Because the WirelessHART protocol described herein allows deployment of mesh topologies, a significant network layer 78 may be specified as well. In particular, the network layer 78 may enable establishing direct wireless connections 65 between individual devices and routing data between a particular node of the wireless network 14 (e.g., the device 34) and the gateway 22 via one or more intermediate hops. In some embodiments, pairs of network devices 30-50 may establish communication paths including one or several hops while in other embodiments, all data may travel either upstream to the gateway device 22 or downstream from the gateway device 22 to a particular node.

To enhance reliability, the WirelessHART protocol 70 may combine TDMA with a method of associating multiple radio frequencies with a single communication resource, e.g., channel hopping. Channel hopping provides frequency diversity which minimizes interference and reduces multi-path fading effects. In particular, the data link 76 may provide a mechanism for a network device to cycle through multiple carrier frequencies during the same or different transmission sessions. For example, the network device 38 may transmit a certain type of data to the network access point 25A once every second in a 10-millisecond timeslot. During a certain 1-second interval, the network device 38 may transmit this data at frequency $F_1$; during the subsequent 1-second interval, the network device 38 may transmit similar data at a frequency $F_2$; etc. In view of various sources of interference which the wireless network 14 may encounter during operation, channel hopping may provide a higher level of reliability by effectively "hedging" the risk of transmitting at a poor-quality channel.

In one embodiment, the network manager 27 is additionally responsible for allocating, assigning, and adjusting time slot resources associated with the data link layer 76. If a single instance of the network manager 27 supports multiple WirelessHART networks 14, the network manager 27 may create an overall schedule for each instance of the WirelessHART network 14.

The WirelessHART protocol 70 may further define links or link objects in order to logically unite scheduling and routing. In particular, a link may be associated with a specific network device, a specific superframe, a relative slot number, one or more link options (transmit, receive, shared), and a link type (normal, discovery, broadcast, join). As illustrated in FIG. 2, the data link layer 76 may be frequency-agile. More specifically, a channel offset may be used to calculate the specific radio frequency used to perform communications. The network manager 27 may define a set of links in view of the communication requirements at each network device. Each network device may then be configured with the defined set of links. The defined set of links may determine when the network device needs to wake up, and whether the network device should transmit, receive, or both transmit/receive upon waking up.

Referring still to FIG. 2, the transport layer 80 of the WirelessHART protocol 70 allows efficient, best-effort communication and reliable, end-to-end acknowledged communications. As one skilled in the art will recognize, best-effort communications allow devices to send data packets without an end-to-end acknowledgement and no guarantee of data ordering at the destination device. User Datagram Protocol (UDP) is one well-known example of this communication strategy. In the process control industry, this method may be useful for publishing process data. In particular, because devices propagate process data periodically, end-to-end acknowledgements and retries have limited utility, especially considering that new data is generated on a regular basis. In contrast, reliable communications allow devices to send acknowledgement packets. In addition to guaranteeing data delivery, the transport layer 80 may order packets sent between network devices. This approach may be preferable for request/response traffic or when transmitting event notifications. When the reliable mode of the transport layer 80 is used, the communication may become synchronous.

Reliable transactions may be modeled as a master issuing a request packet and one or more slaves replying with a response packet. For example, the master may generate a certain request and can broadcast the request to the entire network. In some embodiments, the network manager 27 may use a reliable broadcast to tell each network device in the WirelessHART network 14 to activate a new superframe. Alternatively, a field device such as the sensor 30 may generate a packet and propagate the request to another field device such as to the portable HART communicator 55. As another example, an alarm or event generated by the 34 field device may be transmitted as a request directed to the gateway device 22. In response to successfully receiving this request, the gateway device 22 may generate a response packet and may send the response packet to the device 34, acknowledging receipt of the alarm or event notification.

Referring again to FIG. 2, the session layer 82 may provide session-based communications between network devices. End-to-end communications may be managed on the network layer by sessions. A network device may have more than one session defined for a given peer network device. If desired, all or almost all network devices may have at least two sessions established with the network manager 27: one for pairwise communication and one for network broadcast communication from the network manager 27. Further, all network devices may have a gateway session key. The sessions may be distinguished by the network device addresses assigned to them. Each network device may keep track of security information (encryption keys, nonce counters) and transport information (reliable transport sequence numbers, retry counters, etc.) for each session in which the device participates.

Finally, both the WirelessHART protocol 70 and the wired HART protocol 72 may support a common HART application layer 84. The application layer of the WirelessHART protocol 70 may additionally include a sub-layer 86 supporting auto-segmented transfer of large data sets. By sharing the application layer 84, the protocols 70 and 72 allow for a common encapsulation of HART commands and data and eliminate the need for protocol translation in the uppermost layer of the protocol stack.

In addition to optimizing routing by analyzing the network topology, the network manager 27 may define graphs and allocate resources during scheduling in view of the type of data a particular network device may transmit and, for each type of data, the expected frequency of transmission at each particular device. More specifically, the WirelessHART protocol 70 may support several types of network communication traffic. Both the existing HART protocol 72 and the WirelessHART protocol 70 support exchanging request/response data, publishing of process data, sending broadcast messages, and block data transfer of large data files. The WirelessHART protocol 70 may also support transmission of management data, such as network configuration data, and device communications, such periodic measurements reported by field devices, using the same protocol and the same pool of resources, thus allowing for greater efficiency in scheduling.

Thus, by using the WirelessHART protocol 70 or a similar protocol, the wireless network 14 may provide reliable and efficient transmission of data packets in a variety of industrial applications. FIG. 3 provides a specific example of forming a wireless mesh network in a tank farm 130 to illustrate one of the possible applications of the routing techniques described herein. In this particular example, the tank farm 130 may utilize several WirelessHART devices for level monitoring. More specifically, the tank farm 130 contains several tanks 132 as part of an existing installation. One of ordinary skill in the art will appreciate that in order to add gauging or monitoring capability to the tank farm 130 and to make every tank 132 visible to a DCS 134, the currently known solutions require running cables to each tank to connect newly installed meters or sensors. Without sufficient spare capacity within the existing cable runs, this operation may be an expensive and time-consuming option. On the other hand, the wireless solution described herein could utilize self-powered instruments to report the new process measurements. These measurements could come, for example, from wireless contact temperature monitoring devices 136 which are simple to fit. Moreover, because the engineers and technicians servicing the tank farm 130 would not need to run cables or purchase and install controller input modules, the resulting cost saving could make it economically viable to add several process measurement points to improve process visibility. Thus, as illustrated in FIG. 3, pressure sensors 36 may be additionally added to each tank. The pressure sensors 36, the wireless contact temperature monitoring devices 136, a gateway device 137, and additional wireless devices not shown in FIG. 3 may form a wireless network 140.

As generally discussed above in reference to FIG. 1, it is important to consider the location of the wireless devices on each tank 132 so that the wireless network 140 can establish itself in an efficient and reliable form. In some cases, it may be necessary to add routers 60 in those locations where plant equipment could block or seriously affect a wireless connection. Thus, in this and in similar situations, it is desirable that the wireless network 140 be "self-healing," i.e., capable of automatically addressing at least some of the delivery failures. To meet this and other design requirements, the wireless network 140 may define redundant paths and schedules so that in response to detecting a failure of one or more direct wireless connections 65, the network 14 may route data via an alternate route. Moreover, the paths may be added and deleted without shutting down or restarting the wireless network 140. Because some of the obstructions or interference sources in many industrial environments may be temporary or mobile, the wireless network 140 may be capable of automatically reorganizing itself. More specifically, in response to one or more predetermined conditions, pairs of field devices may recognize each other as neighbors and thus create a direct wireless connection 65 or, conversely, dissolve previously direct wireless connections 65. The network manager 142 (illustrated in FIG. 3 as residing in the gateway device 137) may additionally create, delete, or temporarily suspend paths between non-neighboring devices.

Irrespective of whether a particular network configuration is permanent or temporary, the wireless network 140 requires a fast and reliable method of routing data between nodes. In one possible embodiment, the network manager 142 may analyze the information regarding the layout of the network, the transmission capability and update rate of each network device 36, 136, and 137, as well as other relevant information. The network manager 142 may then define routes and schedules in view of these factors. When defining routes and schedules, the network manager 142 may recognize the wireless network 140 as conforming to one of several network topologies compatible with the routing and techniques of the present disclosure.

FIGS. 4-6 schematically illustrate some of these network topologies. For the sake of clarity, each of FIGS. 4-6 illustrates bidirectional connections between pairs of devices. However, it will be appreciated that each of the topologies illustrated in FIGS. 4-6 is also compatible with unidirectional connections or mixed bidirectional and unidirectional connections (i.e., including both bidirectional and unidirectional connections). Moreover, each connection illustrated in FIGS. 4-6 may support several unidirectional connections in one or both directions, with each unidirectional connection associated with a particular time of transmission, for example. Referring specifically to FIG. 4, a network 150 may have a star network topology. The star network 150 includes a routing device 152 and one or more end devices 154. The routing device 152 may be a network device arranged to route data while the end device 154 may be a network device arranged to send data only on its own behalf and to only receive (or decode) data addressed to the end device 154. Of course, the routing device 152 may also be a recipient and originator of data and may perform routing functions in addition to other tasks. As illustrated in FIG. 4, end devices 154 may have a direct connection 165 to the routing device 152 but end devices 154 cannot be connected directly in a star topology. The direct connection 165 may be a direct wireless connection 65 or a wired connection.

The end device 154 may be the same type of physical device as the routing device 152 and may be physically capable of routing data. The routing capability of the end device 154 may be disabled during the installation of the end device 154 or in operation of a corresponding network (such as the WirelessHART network 14). Moreover, the routing capability of the end device 154 may be disabled by the end device 154 itself or by a dedicated service such as the network manager 27. In some sense, the star network 150 corresponds to the simplest of possible topologies. It may be appropriate for small applications that require low power consumption and low latency. Additionally, it will be noted that the star network 150 is deterministic because there is only one possible route between the routing device 152 and a particular end device 154.

Now referring to FIG. 5, a network 170 is arranged in a mesh network topology. Each network device of the mesh network 170 is a routing device 152. Mesh networks provide a robust network with multiple paths between various devices. In wireless applications, mesh networks are better able to adapt to changing radio environments. For example, the device 174 of the network 170 may send data to the device 176 via an intermediate hop 178 or an intermediate hop 180, provided that the corresponding paths 182-188 allow transmission in this direction. As illustrated in FIG. 5, both a path 182 and a path 184 enable the routing device 174 to send data to the routing device 176, providing redundancy and thus improved reliability to the network 170.

Another type of network topology is illustrated in FIG. 6. The network 190 incorporates elements of both star and mesh topologies. In particular, the star mesh network 190 includes several routing devices 152 (labeled "R") and end devices 154 (labeled "E"). The routing devices 152 may be connected in a mesh format and may support redundant paths. The selection of a particular topology may be performed automatically by a network component, such as the network manager 27, or by a user configuring the network. In particular, the user may choose to override the topology selected by the network manager 27 or the default topology associated with the WirelessHART protocol 70. It is contemplated that in most applications, mesh topology may be the default topology because of the inherent reliability, efficiency, and redundancy of this topology. Clearly, because WirelessHART devices may act as router devices, several different configurations may be compatible with the same physical disposition of field devices and routers.

Both source routing and graph routing may be applied to the topologies discussed in reference to FIGS. 4-6. Although both types of routing may be equally useful in different situations, graph routing will be discussed first. Generally, in mathematical theories and applications, a graph is a set of vertices (nodes such as 152 or 154) and edges (direct connections 65 or 165). The WirelessHART protocol 70 or another protocol servicing the wireless network 14 or 140 may use graphs to configure paths connecting communication endpoints such as the device 30 to the gateway 22 illustrated in FIG. 1, for example. In some embodiments, graphs and the associated paths are configured by the network manager 27. The network manager 27 may also configure individual network devices such as field devices 30-40, routers 60, etc. with partial graph and path information, which may be stored in the connection tables 69. The wireless network 14 may contain multiple graphs, some of which may overlap. Further, a certain network device may have paths of multiple graphs going through the device, and some of the paths may direct data to the same neighbor of the device. Preferably, every graph in a network is associated with a unique graph identifier.

The protocol servicing the wireless network 14 or 140 (such as the WirelessHART protocol 70) may be configured to operate with a number of different topologies to support various application requirements. As a result, the wireless network 14 or 140 may concurrently support several methods of routing, such as unidirectional graph routing and source routing, for example. Although the forthcoming examples of a wireless network support these two approaches, it will be appreciated that the wireless network 14 or 140 may additionally support bidirectional graph routing, or may route data using only one of these techniques. However, irrespective of a type and number of concurrent routing techniques, each device on the wireless network 14 or 140 may be assigned a unique network address. Once every potential receiver of data acquires some form of unambiguous identification with respect to other network elements, decisions related to routing may be made by individual devices such as field devices 30-40, by a centralized dedicated service such as the network manager 27, or by individual devices acting in cooperation with the centralized service. As indicated above, at least one possible implementation of the wireless network 14 may rely on the network manager 27 to carry out most or all of the routing decisions and to communicate the relevant data to the network devices 30-50 to be stored in the connection tables 69. Further, routing decisions can be made at the originating point (i.e. at the source of a data packet) or at a centralized location. Moreover, routing decisions can be adjusted at each intermediate stop, or "hop," in the path of the packet from the source to a destination.

In the examples discussed below, a wireless network provides at least two approaches to routing that may be selected according to the specific requirements and conditions of a given system, such as the physical layout of the network elements that make up the system, the number of elements, the expected amount of data to be transmitted to and from each element, etc. Moreover, the two approaches may be used by the wireless network at the same time and each may be selectively applied to a particular type of data or to a particular host or a set of hosts in view of certain aspects of performance of each of the two approaches. For example, a measurement of a process variable or a command to open a valve may tolerate a relatively small delay in delivery and the wireless network 14 may accordingly apply the faster and the more reliable of the two methods. Meanwhile, a device configuration command or a response may tolerate a longer delay and may be suitable for the other approach.

As briefly indicated above, it is common for a certain distributed control networks and, in particular, to networks connecting devices in the process control industry, to direct data to a certain device for management, diagnostic, log collection, and other purposes. FIGS. 7-9 illustrate several perspectives of a wireless network 200 which implements data transfer in two general directions: toward a gateway 202 (referred to herein as the "upstream" direction) and away from the gateway 202 (referred to herein as the "downstream" direction). For security reasons, the network 200 does not allow direct data transfer between peer field devices although the technique described herein could be used in such a situation if so desired.

FIG. 7 illustrates upstream routing in the network 200. In particular, the network manager 202A (or the stand-by network manager 202B) may define several directed graphs, each graph including either the network access point 205A or a second network access point 205B as the terminal node. A virtual gateway (not shown) may run, for example, on a host connected to the communication backbone 20 and may share the physical host with the network manager 202A or 202B. In at least some of the embodiments, each graph terminating at either the network access point 205A or a second network access point 205B may be logically associated with the virtual gateway of the network 200. In other words, although the paths of each graph in the exemplary network 200 lead to and terminate at one of the two network access points 205A or 205B, these graphs also define communication paths to the virtual gateway. Specifically, a graph 210 (shown in solid bold arrows) may include network devices 212, 214, 216, 218, and the network access point 205A wherein the paths associated with the graph 210 may include direct wireless connections 220, 222, 224, 226, and 228. A graph 240 (shown in dotted bold arrows) may include network devices 212, 216, 218, 242, and the network access point 205A, with a path that includes direct wireless connections 244, 246, 248, 250, and 252. In the directed graph 210, the network device 212 may be called the head of the directed graph 210 and the network access point 205A may be called the tail of the directed graph 210. Similarly, the network device 212 is the head of the directed graph 240 and the network access point 205B is the tail of the directed graph 240. The network manager 202A or, under certain operating conditions, a backup network manager 202B may define the graphs 210 and 240 and may communicate complete or partial definitions of these graphs 210 and 240 to the network devices 212-218 and 242. As discussed above in reference to FIG. 1, the network devices 212-218 and 242 may maintain up-to-date versions of the connection tables 69 storing these partial path definitions. In some embodiments, the network access points 205A-B may not require the information regarding the graphs 210 and 240 if the corresponding communication path terminates at one the network access point 205A-B. However, it will be appreciated that the virtual gateway may also originate data and may store information regarding one or more graphs with paths originating from the network access point 205A-B. It will be further noted that in general, a path of a certain graph may traverse the network access point 205A or 205B as an intermediate node; however, the exemplary network 200 defines paths that always either originate or terminate at one of the network access points 205A or 205B.

By using multiple network access points 25A-B or 205A-B in conjunction with a virtual gateway, the wireless network 14 or 200 may achieve higher reliability. Equally importantly, the multiple network access points 25A-B or 205A-B may serve to define multiple communication paths to the virtual gateway, and each path may be associated with different wireless (e.g., radio) resources such as channels, timeslots, carrier frequencies, etc.

To send a data packet along a certain graph, a source network device may include an identifier of the graph in the header or trailer of the data packet. The data packet may travel via the paths corresponding to the graph identifier until it either reaches its destination or is discarded. To be able to route packets in the graph 210, for example, a connection table 69 of each network device that belongs to the graph 210 may contain entries that include the graph identifier and address of a neighbor network device which (1) belongs to the same graph, and (2) is one hop closer to the destination. For example, the network device 216 may store the following connection table:

| GRAPH IDENTIFIER | NODE |
|---|---|
| GRAPH_210 | 218 |
| GRAPH_240 | 218 |
| GRAPH_240 | 242 | while the network device 242 may store the following information in the connection table:

| GRAPH IDENTIFIER | NODE |
|---|---|
| GRAPH_240 | 205B |

While the exemplary connection tables above simply list the devices associated with a particular entry, it will be noted that the NODE column of the connection table may store the address of the neighboring device as defined in the addressing scheme of the network 200 or WirelessHART network 14.

In another embodiment, the NODE column may store the nickname of the neighboring device, an index into an array storing full or short addresses of the neighbors, or any other means of unambiguously identifying a network device. Alternatively, the connection table may store graph identifier/wireless connection tuples as illustrated below:

| GRAPH IDENTIFIER | CONNECTION |
|---|---|
| GRAPH_210 | 226 |
| GRAPH_240 | 246 |
| GRAPH_240 | 248 |

In other words, the connection table may list one or more direct wireless connections 65 corresponding to a particular graph. The network device 216 may, for example, consult the connection table and transmit a packet carrying the graph identifier 240 via the direct wireless connection 246 or 248.

As illustrated in FIG. 7 and in the tables above, redundant paths may be set up by having more than one neighbor associated with the same graph identifier. Thus, a data packet arriving at the network device 216 and containing the graph identifier 240 in the header or trailer may be routed to either the network device 218 or to the network device 242. While executing a routing operation, the network device 216 may perform a lookup in the connection table by the graph identifier 240, and send the packet to either (or both) of the network devices 218 or 242. Moreover, the routing selection between two or more possible hops may be random or may be carried out according to a predefined algorithm. For example, the selection may be made in consideration of a load balancing objective or in view of the delivery statistics. Thus, the network device 216 may learn, through a peer network device or from the network manager 27, that selecting the network device 218 as the next hop while routing packets along the graph 240 has a lower probability of delivering the packet successfully or has a longer expected or average delay in delivery. The network device 216 may then attempt to route more or possibly all of the packets associated with the graph 240 to the network device 242.

In one embodiment, a neighbor device acknowledges the receipt of a data packet by sending a confirmation packet. In the example above, once the neighboring network device 218 or 242 acknowledges receipt of the packet, the network device 216 may immediately release it. If, on the other hand, the acknowledgement is not received within a predefined time period, the network device 216 may attempt to route the packet via the alternate hop or path. Additionally, the network device 216 may collect statistics of both successful delivery attempts and of failed delivery attempts. The subsequent routing decisions, such as selecting between the hops 218 and 242, may include or be based on the adjusted statistical data. Of course, the network device 216 may apply the statistics related to network devices 218 and 242 to other relevant graphs and may also communicate the statistics to other network devices, either directly or via the network manager 27.

As discussed above, in the graph routing approach, a network device sends packets with a graph identifier in a network header along a set of paths to the destination. Importantly, a graph identifier alone is sufficient for routing packets and, while other routing information may be also included in the header, each packet can be properly delivered based solely on the graph identifier. All network devices on the way (i.e., on the path) to the destination may be pre-configured with graph information that specifies the neighbors to which the packets may be forwarded. Because graph routing requires pre-configuration of intermediate network devices for each potential destination, graph routing may be better suited for communications from a network device to a gateway and from a gateway to a network device.

Now referring to FIG. 8, the network manager 202A or 202B may also support routing downstream with respect to one or both of the gateways 205A-B. In particular, a graph 280 (shown in solid bold arrows) may include the nodes 215, 214, and 212, and the direct wireless connections 282-286. The network access point 205A is the head of the graph 280 and wireless device 212 is the tail of the graph 280. Meanwhile, a graph 290 (shown in dotted bold arrows) may similarly connect the network access point 205A to the wireless device 212, with the network access point 205A as the head of the graph 290. However, the graph 290 may include the nodes 205A, 218, 242, 216, and 212, and the direct connections 292-298. Thus, to send a data packet to the wireless device 212, the network access point 205A may include a graph identifier in the header or the trailer of the data packet which corresponds to either the graph 280 or 290. It will be appreciated that each of the graphs 280 or 290 may also include duplicate connection paths to ensure reliability and that, in general, the network manager 202A or 202B may use techniques similar to those discussed above in reference to FIG. 7. Also, it will be noted that the connection table 69 of each of the wireless devices 212-218 and 242 may include graph route information related to both downstream and upstream graphs used for routing purposes.

As illustrated in FIG. 9, the wireless network 200 may additionally use source routing. In source routing, pre-configuration of the relaying devices is not necessary. To send a packet to its destination using source routing, the source network device may include, in the header of a data packet, for example, an ordered list of devices through which the data packet must travel. The ordered list of devices may effectively define a communication path for the data packet. As the packet traverses the specified path, each routing device may extract the next node address from the packet to determine where the data packet should travel next, i.e., where the next data packet should be sent in the next hop. Consequently, source routing requires advance knowledge of the topology of the wireless network 14. If, however, a certain network device does not find itself on the routing list, the network device may send the packet back to the first device specified in the source routing list. Source routing allows packets to go to an arbitrary destination without an explicit or preconfigured setup of intermediate devices.

For example, the network device 212 may send a packet to the network access point 205A by specifying the complete path in the packet header or the packet trailer. As illustrated in FIG. 9, the network device 212 may generate a routing list 310 containing the addresses of network devices 214, 215, and 205A and send the list 310 along with the packet to the first hop or device on the list, i.e., the network device 214. The network device 214 may then traverse the list 310, locate the identity of the network device 214, extract this field from the list 310, identify the network device 215 as the next hop for the received packet, and finally send the data packet to the network device 215. The source routing list may reside in the optional area of the network header, and may be of variable size depending on number of hops to the destination. Similarly, the network device 215 may traverse the list 310, locate its own address or identity, and send the data packet to the next hop or device in the list 310 (in this case, the network access point 205A).

In general, only those network devices that have obtained full network information from the network manager 27, 142, or 202A-B use source routing because only the network manager 27, 142, or 202A-B knows the complete topology of the network. An additional limitation of source routing is that it provides no redundancy at intermediate network devices because each packet is originated with a header or a trailer that explicitly specifies each intermediate hop and does not provide any routing alternatives. Thus, if one of the intermediate network devices fails to relay the packet as specified by the packet header or trailer, the delivery of the packet along the specified source route fails. The intermediate node which has detected the source route failure may nevertheless attempt to deliver the data packet by deferring to graph routing. Thus, each data packet specifying source routing in the header or trailer preferably includes a graph identifier as a routing backup. When a failure in source routing occurs, the intermediate (or, in some case, the source) node notifies the network manager 27, 142, or 202A-B with a path failure message. It is then the responsibility of the network manager 27, 142, or 202A-B to reprogram or reconfigure the source with an alternate route. To facilitate the detection of such error cases, the wireless network 14, 140, or 200 requires network devices to send routing failure notifications to the network manager 27, 142, or 202A-B. Accordingly, a protocol such as the WirelessHART protocol 70 may provide a message type or an information element in the protocol definition for reporting this and other types of delivery failures. In another embodiment, the routing list 310 (referring to FIG. 9) may specify alternate routes in addition to the route selected by the sender. In yet another embodiment, primary and one or more alternate routes may be partially merged to avoid duplication of common parts of the path in the packet header or trailer.

Preferably but not necessarily, the routing list 310 includes a complete path definition defining a complete route from the source to the destination. Alternatively, a data packet may be sent without a complete list 310 and may only specify the communication path up to a certain intermediate device. As discussed above, the intermediate device may then route the data packet to the final destination using the graph routing technique.

Referring generally to FIGS. 1, 3, and 7-9, the network manager 27, 142, or 202A-B may maintain a list of all devices in the network. The network manager 27, 142, or 202A-B may also contain the overall network topology including a complete graph of the network and the up-to-date portions of the graph that have been communicated to each device. The network manager 27 may generate the route and connection information using the information that the network manager 27 receives from the network devices 30-40, 50, 60, 55, etc. The network manager 27, 142, or 202A-B may then build the graph of the network from the list of network devices and the neighbors reported by each network device. Referring back to FIG. 1, for example, the network device 50B may report "seeing" the neighbor devices 60 and 34. The network manager 27, 142, or 202A-B may be also responsible for generating and maintaining all of the route information for the corresponding network. In one embodiment, there is always one complete network route and several special purpose routes which are used to send setpoint and other settings from the network manager 202A or 202B to the recipients of control commands (FIGS. 7-9). Further, broadcast routes (which flow through most or all of the devices in the network) may be used to send broadcast messages from the network manager 27, 114, or 202A-B to all of the devices of the network 14 or 200. Still further, the network manager 27, 114, or 202A-B may also carry out the scheduling of network resources once the routing information and burst mode update rates are known.

When devices are initially added to the network 14, 140, or 200, the corresponding network manager may store all neighbor entries as reported from each network device. The network manager 27, 114, or 202A-B may use this information to build an initial complete network graph and to revise the graphs during operation. The network graph is put together optimizing several properties including hop count, reporting rates, power usage, and overall traffic flow as reflected by the statistics gathering discussed above. One key aspect of the topology is the list of connections that connect devices together. Because the presence and health of individual connections may change over time, the network manager 27, 114, or 202A-B may be additionally programmed or configured to update the overall topology, which may include adding and deleting information in each network device. In some embodiments, only the network manager 27, 114, or 202A-B and the gateway 22 or 202A-B may know enough information to use source routing. More specifically, it may be desirable to prevent peer-to-peer communication between any two arbitrary devices for security purposes.

In short, graph routing may direct traffic both upstream and downstream with respect to the network manager 27 or gateway 22 and both graph and source routes can be optimized to satisfy applications with low latency requirements, which includes measurement information that is transferred from network devices to the gateway and control information that is transferred from gateway devices to final control commands such as regulating valves, on-off valves, pumps, fans, dampers, as well as motors used in many other ways.

In some embodiments, path redundancy may be a matter of policy of the network manager 27, 114, or 202A-B rather than a coincidental overlap of graphs. In other words, the network manager 27, 114, or 202A-B may attempt to define at least two neighbors for each device. Thus, the network manager 27, 114, or 202A-B may be configured to actively pursue a mesh or a star mesh topology. The supporting protocol, such as the WirelessHART protocol 70, may thus provide a very high end-to-end data reliability. From the physical perspective, each field device or other network device should be within communication range of at least two other devices that can receive messages from the field device and forward them.

The network manager 27, 114, or 202A-B may additionally verify each graph definition in order to ensure that no loops have been formed. In those embodiments where the network manager 27, 114, or 202A-B actively pursues path redundancy and defines many graphs of various size, a communication path may be sometimes erroneously defined to direct data packets from a source back to the same source. In accordance with such faulty graph definition, a packet may be routed back to the source directly from the source or may visit one or more intermediate hops prior to arriving back at the source. Loop verification may be performed each time the topology of the associated network changes, such as due to an addition or removal of a device, or whenever the network manager 27 adjusts the routing graphs and schedules for any reason. Alternatively, the network manager 27 may perform loop checking periodically as a background task.

As indicated above, devices involved in routing refer to the graph route, the source route, or to the address of the destination in order to deliver and properly relay data packets. The address of each network device must be globally unique in order for the WirelessHART network 14 to properly co-operate with a larger network which may include wired HART devices. For this reason, the WirelessHART protocol 70 may additionally provide an unambiguous addressing scheme and additionally provide an efficient mapping of addresses to a larger network context.

FIGS. 10 and 11 illustrate example procedures related to routing which the network devices in the wireless networks 14, 140, or 200 may execute when originating and relaying data packets, respectively. In particular, a network device may store a procedure 350 as a set of computer instructions in the memory of the network device, or may implement the procedure 250 as a dedicated electronic circuit (ASIC).

In a block 352, the procedure 350 retrieves a data packet for transmission to a destination, or "target" network device. In particular, the procedure may receive a payload which includes process control data (e.g., a command to open a valve, a pressure measurement, etc.), a network configuration data (e.g., a request to allocate more bandwidth, an indication that a new neighbor had been discovered, etc.), or other type of data. The procedure may prepare the data packet for transmission by populating the header, the trailer, or other relevant part(s) of the data packet with sufficient routing information to allow the data packet to reach a destination device. In the example embodiment illustrated in FIG. 10, the procedure 350 may check, in a block 354, whether the data packet requires a low latency. If the data packet does not have a low latency requirement, the procedure 350 may choose to send the data packet by means of source routing, rather than graph routing, in order to better allow higher priority data to use time-critical resources. As discussed above, the procedure 350 may identify process control data as low-latency data and network management data as non-low-latency data, for example. Of course, the procedure 350 may also perform other types of checking in the block 354, such as checking whether the data packet is related to a high-priority alarm, for example.

If the data packet received in the block 352 does not have a low latency requirement, the procedure 350 may check whether the network device has sufficient information about the topology of the network to specify a complete path to the destination (block 355). Referring back to FIG. 1, for example, in order for the network device 34 to specify a complete path to the gateway device 22, the network device 34 would need to know about the direct connections 65 between the pairs of network devices 34 and 32, 32 and 50A, 50A and 25A, provided that these connections support connections in the required direction. Thus, the procedure 350 may determine in the block 355 that a complete path to the target device cannot be fully identified, and may send the data packet by means of graph routing.

If, on the other hand, the procedure 350 determines in the block 354 that the data packet has a low latency requirement (or if the procedure 350 determines in the block 355 that complete path to the target device is unknown), the procedure 350 may identify an appropriate graph in the block 356. Referring back to FIG. 7, for example, the wireless device 216 may identify the graph 240 as a possible path to the network access point 205B. As discussed above, the wireless device 216 may store the information sufficient to make this determination in the connection table 69. Next, in a block 358, the procedure 350 may attach the graph identifier of the graph 240 to the header or trailer of the data packet. It will be appreciated that, in general, the protocol servicing the wireless network (such as the WirelessHART protocol 70, for example) may provide various efficient means of associated routing information with a data packet. Thus, one of ordinary skill in the art will appreciate that the specific example of inserting the graph identifier into the header or trailer of a data packet is provided by way of example only, and that other alternatives are also contemplated.

The procedure 350 may then identify the next hop in the communication path associated with the graph selected in the block 358 (block 360). Referring again to FIG. 7, the device-specific connection table 69 of the wireless device 216 may store the following entry:

| GRAPH IDENTIFIER | NODE |
|---|---|
| GRAPH_240 | 218 |
| GRAPH_240 | 242 |

In this particular case, the network device 252 may select between two options, both suitable for routing the data packet along the graph 240. As discussed above, the procedure 350 may use a number of methods to select between the available options in the block 360. Finally, the procedure 350 may send the packet to the next hop in a block 362. To continue with the example discussed above in reference to the network device 216 of FIG. 7, the procedure 350 may send the packet to the node 218.

If, in the block 354, the procedure 350 determines that enough information for specifying a complete path for the data packet is available, the procedure 350 may proceed to a block 364 and obtain the path information. For example, when the wireless device 214 (FIG. 7) is sending a data packet to the network access point 205A, the device 214 may retrieve the list including the addresses or other type of identifiers of the network devices 218 and 205A. Next, similar to a step 358 discussed above, the procedure 350 may attach the complete path information to the data packet as an ordered list specifying the network devices 218 and 205A, to continue with the same example. The procedure may then look up the next hop in the generated list (block 368), as illustrated in detail in FIG. 9 with respect to the list 310, for example. The procedure 350 may then proceed to the block 362, in which the network device transmits the data packet to the neighbor identified either in the block 360 or in the block 368.

Upon receiving the data packet, the neighbor may in turn execute a routing procedure 400 (FIG. 11) to either receive and process the data packet sent to the neighbor or forward the data packet to the next hop in the communication path. The procedure 400 may receive the data packet including the header, the trailer, or other priority-related and routing-related information in a block 402 and may check the type of routing in a block 404. To indicate the type of routing (graph routing, source routing, etc), the wireless protocol may use a flag in the header, for example, or any other known or desired means of signaling the type of information that is to follow in the packet. If the procedure 400 determines that graph routing is used, the procedure 400 may then check whether the graph identified in the header or trailer of the data packet terminates in the device (block 406). Referring back to FIG. 8, the wireless device 242 may, for example, receive a data packet including a graph identifier associated with the graph 290. In the block 406 of the procedure 400, the wireless device 242 may check the device-specific routing table 69 to see whether the wireless device 242 is listed as a tail of the graph 290. In other words, the wireless device 242 may determine whether the data packets carrying the identification of the graph 290 are sent to the wireless device 242 or merely via the wireless device 242 to another network device. If the procedure 400 determines that the network device executing the procedure 400 is not the tail of the graph identified in the block 404, the wireless device 242 may determine the next hop in the list by checking the device-specific connection table 69, as discussed above in reference to FIG. 6 or 10 (block 408). Otherwise, the procedure 400 may proceed to processing, or "consuming" the data packet in the block 410.

Alternatively, the procedure 400 may proceed to a block 412 upon identifying the type of routing as source routing in the block 404. In this case, the procedure 400 may traverse the list to locate the identity of the device executing the procedure 400. As discussed earlier in reference to FIG. 9, the list 310 may sequentially list every intermediate and possibly terminating network device in the corresponding communication path. Upon locating its own identity, the device executing the procedure 400 may then check whether this identity information is the last identity in the list 310 (block 414). It will be appreciated that the other methods of identifying the target or destination network device may also be used. For example, each data packet may include the destination information in addition to the list 310 or the graph identifier. However, the example procedure 400 may derive the target information from the position of the device identity relative to the end of the list 310. The procedure 400 may process or consume the data packet if the device identity is not followed by any information identifying further hops in the list 310 (block 410). Otherwise, the procedure 400 may attempt to extract the address of the next hop (block 416) and, if the procedure 400 finds the address and identifies a neighbor device corresponding to the address (block 417), the procedure 400 may send the data packet to the identified network node (block 418). If, on the other hand, the procedure 400 cannot successfully extract the next hop information in the block 417, the procedure 400 may attempt to use an appropriate graph route instead. In at least some of the embodiments, a data packet including source routing information such as the list 310 may additionally include a graph identifier. In this sense, the data packet may specify source routing as a primary routing method and graph routing as a secondary routing method.

In some embodiments, the procedure 400 may perform additional manipulation of the list 310 at each intermediate hop. For example, the procedure 400 may delete the identity of the current hop from the list 310 to reduce the size of the header. Thus, the list 310 may shrink every time the corresponding data packet traverses a link if source routing is used.

It will be appreciated that some of the methods discussed above need not be restricted to data packets and may be applied to other communication techniques. For example, a network may use a circuit-switched approach and instead of traveling in packets of a finite size, the data may be transmitted as a stream over a dedicated channel between communication endpoints. In this case, the routing information such as graph identity or complete path information may be supplied separately from the circuit over a dedicated channel, for example.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed is:

1. A method of routing data in a multi-node communication network operating in a process control environment, the method comprising:
defining a first graph, including:
assigning a first node to be exactly one source of the first graph;
assigning a second node to be destination of the first graph;
associating one or more intermediate nodes of the multi-node communication network with the first graph; and
associating a first graph identifier with the first graph;
defining a second graph, including:
assigning the first node to be exactly one source of the second graph;
associating a third node with a destination of the second graph; and
associating a second graph identifier with the second graph; and
sending a first data packet from the first node;
sending one of the first graph identifier or the second graph identifier with the first data packet; and
routing the first data packet along the first graph or the second graph based on the first graph identifier or the second graph identifier.

2. The method of claim 1, wherein sending the first data packet from the first node includes sending one of measurement data associated with sensing or measurement functions or control data associated with actuating or positioning functions, and wherein at least one of the first node, the second node, or the third node is a field device operating in the process control environment.

3. The method of claim 2, wherein sending the first data packet from the first node further includes sending one of the measurement data or the control data to or from a gateway device connecting the multi-node communication network with an external network.

4. The method of claim 1, wherein defining the first graph includes associating a primary communication path of the first graph with a plurality of direct wireless connections between pairs of nodes of the multi-node communication network.

5. The method of claim 4, wherein defining the first graph includes defining a directed graph, such that data travels in only one direction along each direct wireless connection associated with the first graph.

6. The method of claim 5, wherein the first graph has exactly one destination node.

7. The method of claim 4, wherein defining the first graph includes providing a first partial definition of the first graph to one of the one or more intermediate nodes associated with the first graph, wherein the first partial definition includes information related to a neighbor network node associated with the first graph and connected to the one of the one or more intermediate nodes via a first one of the plurality of direct wireless connections associated with the first graph and includes an identification of a portion of the primary communication path.

8. The method of claim 7, wherein providing the first partial definition of the first graph to the one of the one or more intermediate nodes further includes providing at least one redundant neighbor network node distinct from the neighbor network node, wherein the at least one redundant neighbor network node is associated with the first graph and is connected to the one of the one or more intermediate nodes via a second one of the plurality of the direct wireless connections on a secondary communication path associated with the first graph; and wherein routing the first data packet based on the first graph identifier includes selecting the at least one redundant neighbor network node at the one of the one or more intermediate nodes after considering the ability to route via the neighbor network node.

9. The method of claim 8, wherein selecting the redundant neighbor network node at the one of the one or more intermediate nodes includes selecting the redundant neighbor network node based on statistical data indicative of a probability of successfully delivering the first data packet via the neighbor network node.

10. The method of claim 1, wherein defining the second graph includes:
associating a further set of one or more intermediate nodes of the multi-node communication network with the second graph, the second graph specifying a further primary communication path along which a communication packet is to be routed between the third node associated with the destination of the second graph and the first node associated with the exactly one source of the second graph via at least some of the further set of intermediate nodes.

11. The method of claim 1, further comprising:
sending a second data packet from the first node associated with the exactly one source of the first graph;
sending a complete list of intermediate nodes with the second data packet;
routing the second data packet to the second node associated with the destination of the first graph based on the complete list of intermediate nodes.

12. The method of claim 11, further comprising providing the first node with at least a partial topology of the multi-node communication network, so that the first node is aware of at least one complete communication path from the first node to the second node.

13. The method of claim 11, wherein sending the first data packet includes sending data associated with at least one of a first latency requirement or a first reliability requirement; and wherein sending the second data packet includes sending data associated with at least one of a second latency requirement or a second reliability requirement.

14. The method of claim 11, wherein sending the first data packet includes sending process control information and wherein sending the second data packet includes sending network management information.

15. The method of claim 1, wherein defining the second graph includes:
assigning one or more further intermediate nodes to the second graph, the second graph specifying a predetermined path along which a communication packet is to be routed from the first node associated with the exactly one source node of the second graph to the third node associated with the destination of the second graph via the one or more further intermediate nodes; and
wherein the first node and the node are field devices operating in the process control environment, and wherein the second node associated with the destination of the first graph is a gateway device connecting the multi-node communication network with an external network;
the method further comprising:
sending a second data packet from the first node associated with the exactly one source of the first graph to the third node associated with the destination of the second graph, including:
sending the first graph identifier with the second data packet at the first node associated with the exactly one source of the first graph;
routing the second data packet to the second node associated with the destination of the first graph based on the first graph identifier;
sending the second graph identifier with the second data packet at the second node associated with the destination of the first graph; and
routing the second data packet to the third node associated with the destination of the second graph based on the second graph identifier.

16. The method of claim 1, wherein each of sending the first data packet, sending the ine of the first graph indentifier or the second graph identifier, and routing the first data packet is supported by a communication protocol of the multi-node communication network, wherein the communication protocol further supports commands of the Highway Addressable Remote Transmitter (HART) protocol.

17. The method of claim 1, further comprising:
sending a list of intermediate nodes with the first data packet, wherein the list of intermediate nodes specifies a complete path from the first node associated with the exactly one source of the first data packet to a destination of the data packet in an order encountered in a direction of the destination of the data packet; and
wherein routing the first data packet based on the first graph identifier includes:
forwarding the data packet to an intermediate node included in the list of intermediate nodes according to the list of intermediate nodes;
detecting an error in forwarding the data packet from the intermediate node toward the destination of the data packet according to the list of intermediate nodes; and
routing the data packet to the destination of the data packet using the first graph identifier in response to detecting the error.

18. The method of claim 17, wherein detecting an error includes detecting an unavailability, at the intermediate node, of a next node following the intermediate node in the list of intermediate nodes.

19. A device for operating in a multi-node mesh network comprising:
a network interface to establish a connection with at least one peer device;
a computer-readable memory unit storing:
a substantially unique device network address, wherein the device network address is associated with the device;
a graph routing table including:
a network address of a first peer device;
a first graph identifier associated with a first graph including the device and the first peer device, wherein the first graph connects a source of the first graph to a destination node via a first one or more intermediate devices;
a network address of a second peer device; and
a second graph identifier associated with a second graph including the device and the second peer device, wherein the second graph includes a communication path along which a communication packet can be routed from a source of the second graph to the destination node via a second one or more intermediate devices;
a set of computer instructions to route a data packet based on a graph identifier associated with the data packet; and
a processor unit adapted to control the network interface and execute the computer instructions stored in the memory unit.

20. The device of claim 19, wherein the connection with the at least one peer device is a direct wireless connection, such that the device and the at least one peer device exchange data without a use of an intermediate network device.

21. The device of claim 19, wherein the first graph further includes the second peer device.

22. The device of claim 19, wherein the computer-readable memory unit further stores:
   a path information associated with a primary communication path from the device to the destination node, wherein the path information specifies each intermediate peer device between the device and the destination node.

23. The device of claim 19, wherein the first graph defines a flow of data from a second peer device to a third peer device via the device and the first peer device.

24. The device of claim 19, wherein the multi-node mesh network operates in a process control environment; and wherein the device further comprises a process control module adapted to perform a process control function in the process control environment.

25. The device of claim 24, wherein the first graph is a unidirectional graph defining a flow of data from a peer field device to a gateway device via the device and the first peer device; wherein the gateway device operatively connects the multi-node mesh network to a plant automation network.

* * * * *